(12) United States Patent
Takada et al.

(10) Patent No.: US 8,747,540 B2
(45) Date of Patent: Jun. 10, 2014

(54) CELLULOSE ESTER FILM, POLARIZING PLATE, LIQUID CRYSTAL DISPLAY DEVICE, AND METHOD FOR MANUFACTURING THE CELLULOSE ESTER FILM

(75) Inventors: Ryosuke Takada, Kanagawa (JP); Jun Takeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 13/369,688

(22) Filed: Feb. 9, 2012

(65) Prior Publication Data
US 2012/0204758 A1  Aug. 16, 2012

(30) Foreign Application Priority Data

Feb. 10, 2011 (JP) ................. 2011-027914

(51) Int. Cl.
| | | |
|---|---|---|
| C08L 1/00 | (2006.01) |
| C08L 3/00 | (2006.01) |
| C08L 5/00 | (2006.01) |
| C09D 101/00 | (2006.01) |
| C09D 103/00 | (2006.01) |
| C09D 105/00 | (2006.01) |
| C09J 101/00 | (2006.01) |
| C09D 4/00 | (2006.01) |
| C09D 201/00 | (2006.01) |
| C09J 4/00 | (2006.01) |
| C09J 201/00 | (2006.01) |
| C08L 1/14 | (2006.01) |
| C08L 1/10 | (2006.01) |
| G02B 5/30 | (2006.01) |

(52) U.S. Cl.
CPC ................. *C08L 1/10* (2013.01); *G02B 5/3033* (2013.01); *C08L 1/14* (2013.01)
USPC .............. 106/170.31; 106/162.1; 106/163.01; 106/168.01

(58) Field of Classification Search
USPC ................ 106/168.01, 163.01, 162.1, 170.31
See application file for complete search history.

(56) References Cited

U.S. PATENT DOCUMENTS

| | | | | |
|---|---|---|---|---|
| 3,899,452 A | * | 8/1975 | Koch et al. ........................ 521/55 |
| 6,712,896 B2 | * | 3/2004 | Ono et al. ................... 106/162.1 |
| 7,125,591 B2 | * | 10/2006 | Nakajima et al. ............ 428/1.33 |
| 8,142,864 B2 | * | 3/2012 | Suzuki et al. .................... 428/1.1 |
| 2011/0223435 A1 | * | 9/2011 | Naito et al. .................... 428/461 |

FOREIGN PATENT DOCUMENTS

JP  2008-058893 A  3/2008

* cited by examiner

*Primary Examiner* — James McDonough
(74) *Attorney, Agent, or Firm* — Jean C. Edwards, Esq.; Edwards Neils PLLC

(57) ABSTRACT

There is provided a cellulose ester film comprising at least one plasticizer and satisfying the following expressions (1) to (5); $|Re| \leq 5$ nm (1); $50$ nm $< Rth < 300$ nm (2); $25$ μm $\leq d \leq 65$ μm (3); $1 \times 10^{-3} \leq Rth/d \leq 4 \times 10^{-3}$ (4); $3.8$ GPa $< E' < 5.0$ GPa (5); wherein Re represents a retardation value in an in-plane direction; Rth represents a retardation value in a thickness direction; d represents a film thickness; and E' represents an elastic modulus of the film.

7 Claims, No Drawings

CELLULOSE ESTER FILM, POLARIZING PLATE, LIQUID CRYSTAL DISPLAY DEVICE, AND METHOD FOR MANUFACTURING THE CELLULOSE ESTER FILM

CROSS-REFERENCE TO RELATED APPLICATIONS

This application claims priority from Japanese Patent Application No. 2011-27914, filed Feb. 10, 2011, the contents of all of which are hereby incorporated by reference in their entirety.

BACKGROUND OF THE INVENTION

1. Field of the Invention

The present invention relates to a cellulose ester film and a method for manufacturing the same. In more detail, the invention relates to a cellulose acylate film which contains a cellulose acylate and has a large Rth per film thickness and in which when processed into a polarizing plate and then stuck to a panel, its display becomes uniform within a plane, and a method for manufacturing the same. The invention also relates to a polarizing plate and a liquid crystal display device each using the cellulose acylate film.

2. Description of the Related Art

In liquid crystal display devices of recent years, slimming has been advanced, and a trend toward this is conspicuous especially in liquid crystal display devices for television in which high added values such as high definition and large screen are required.

In response thereto, slimming of respective constitutional parts is required. In particular, for members in a film form, such as polarizing plates and optically compensatory films, optical films satisfying the requirement for slimming and simultaneously having suitable optical performance and mechanical physical properties are demanded.

Also, in designing the optical performance, in addition to the trend toward slimming by complexation of functions of an optical film such as adoption of a biaxial film, for the purposes of ensuring robustness against a performance fluctuation by the environment and ensuring stiffness, lamination of a uniaxial film such as a so-called A-plate having a retardation only in an in-plane direction and a so-called C-plate having a retardation only in a thickness direction is also studied. It may be considered that a necessity for uniaxial films having high versatility, and in particular, in the case of considering slimming, a C-plate having a retardation only in a thickness direction, will increase.

As for a relation between optical function and elastic modulus, for example, JP-A-2008-058893 describes an increase of the elastic modulus in a stretching direction by stretching a cellulose film. However, in that case, a retardation is generated in the stretching direction, (that is, Re which is in plane retardation increases) so that though the elastic modulus can be ensured, the film becomes a biaxial film, and the technology of this patent document is not applicable to the formation of a uniaxial film, and in particular, it is unsuitable for the formation of a C-plate substantially having only retardation (Rth) in a thickness direction.

SUMMARY OF THE INVENTION

As described above, in a cellulose ester film, it is difficult to make both an elastic modulus and an improvement in Rth per film thickness compatible with each other, and it was the existing condition that productivity or costs and other performances due to the use of an expensive special additive must be sacrificed in order to ensure compatibility between these.

That is, a problem to be solved by the invention is to provide a cellulose ester film which can be used as an optically compensatory film which does not substantially have a retardation in an in-plane direction and which has a large Rth per film thickness and a moderate elastic modulus, and a method for manufacturing the same.

In order to solve the foregoing problem, the present inventor made extensive and intensive investigations. As a result, it has been found that by adopting a specified manufacturing condition, various cellulose ester films capable of making both the foregoing physical properties and optical characteristics compatible with each other and solving the foregoing problem can be provided, leading to accomplishment of a cellulose ester film of the invention.

Specifically, the foregoing problem has been solved by the following means.

[1] A cellulose ester film comprising at least one plasticizer and satisfying the following expressions (1) to (5):

$$|Re| \leq 5 \text{ nm} \tag{1}$$

$$50 \text{ nm} < Rth < 300 \text{ nm} \tag{2}$$

$$25 \text{ μm} \leq d \leq 65 \text{ μm} \tag{3}$$

$$1 \times 10^{-3} \leq Rth/d \leq 4 \times 10^{-3} \tag{4}$$

$$3.8 \text{ GPa} < E' < 5.0 \text{ GPa} \tag{5}$$

wherein Re represents a retardation value in an in-plane direction; Rth represents a retardation value in a thickness direction; d represents a film thickness; and E' represents an elastic modulus of the film.

[2] The cellulose ester film according to [1] above, wherein the plasticizer is a polycondensed polyester containing an aromatic ring.

[3] The cellulose ester film according to [2] above, wherein the polycondensed polyester satisfies the following (I) and (II):

(I) it contains a dicarboxylic acid residue containing an aromatic dicarboxylic acid residue and an aliphatic dicarboxylic acid residue having an average carbon number of from 4.0 to 5.0 and having an aromatic dicarboxylic acid residue ratio as expressed by the following expression of from 40 mol % to 95 mol %:

Aromatic dicarboxylic acid residue ratio (mol %)=
[(Aromatic dicarboxylic acid residue (mol))/{(Aromatic dicarboxylic acid residue (mol))+(Aliphatic dicarboxylic acid residue (mol))}]×100 and (II) it contains an aliphatic diol residue having an average carbon number of from 2.0 to 3.0.

[4] The cellulose ester film according to [2] or [3] above, wherein the polycondensed polyester has a number average molecular weight of 700 or more and not more than 2,500.

[5] The cellulose ester film according to any one of [1] to [4] above, wherein the cellulose ester film is a film stretched at least 3% or more in a TD direction.

[6] The cellulose ester film according to any one of [1] to [5] above, wherein the cellulose ester film is constituted of a cellulose acylate, and the cellulose acylate film has an acyl group substitution degree of from 2.10 to 2.95.

[7] A polarizing plate utilizing the cellulose ester film according to any one of [1] to [6] above.

[8] A liquid crystal device utilizing the cellulose ester film according to any one of [1] to [6] above or the polarizing plate according to [7] above.

[9] A method for producing the cellulose ester film according to any one of [1] to [6] above, wherein the cellulose ester film is stretched 3% or more in a TD direction.

A cellulose ester film having a desired elastic modulus, not substantially having a retardation in an in-plane direction, and having a large Rth per film thickness, and a method for manufacturing the same can be provided. Also, a liquid crystal display device using the cellulose ester film of the invention reveals a favorable display performance even in the case of being increased in size.

DETAILED DESCRIPTION OF THE INVENTION

The contents of the invention are hereunder described in detail. Explanation of constituent features described below will be made on the basis of representative embodiments of the invention, but it should not be construed that the invention is limited to such embodiments. Incidentally, in the specification of this application, a numerical range expressed by the terms "a number to another number" means a range falling between the former number indicating a lower limit value of the range and the latter number indicating an upper limit value thereof. In this specification, a film conveying direction is sometimes referred to as a vertical direction, a film longitudinal direction, or an MD direction; and a direction orthogonal to the film conveying direction is sometimes referred to as a horizontal direction, a film width direction, or a TD direction.

[Cellulose Ester Film]

The cellulose ester film of the invention (hereinafter also referred to as "film of the invention") satisfies the following expressions (1) to (5).

$$|Re| \leq 5 \text{ nm} \quad \text{Expression (1)}$$

In the expression (1), Re represents a value (unit: nm) obtained by subtracting a value of an in-plane retardation at a wavelength of 590 nm.

$$50 \text{ nm} < Rth < 300 \text{ nm} \quad \text{Expression (2)}$$

$$25 \text{ μm} \leq d \leq 65 \text{ μm} \quad \text{Expression (3)}$$

$$1 \times 10^{-3} \leq Rth/d \leq 4 \times 10^{-3} \quad \text{Expression (4)}$$

In the expression (4), Rth represents a value of a retardation (unit: nm) in a film thickness direction at a wavelength of 590 nm; and d represents a film thickness (unit: m).

$$3.8 \text{ GPa} < E' < 5.0 \text{ GPa} \quad \text{Expression (5)}$$

In the expression (5), E' represents an elastic modulus of the film.

The cellulose ester film of the invention is preferably a cellulose acylate film containing a cellulose acylate, and it is preferable to contain a cellulose acylate having a total acyl substitution degree of from 2.10 to 2.95, and preferable to have an elastic modulus in a film conveying direction of 3,200 MPa or more.

Also, the film of the invention can be manufactured by a manufacturing method of a film of the invention. The film of the invention is hereunder described.

<Film Characteristics>
(Retardation)

In this specification, Re (λ) and Rth (λ) represent an in-plane retardation and a retardation in a thickness direction at a wavelength of λ, respectively. In the specification of this application, the wavelength λ is defined as 590 nm unless otherwise indicated. The Re (λ) is measured by making light having a wavelength of λ nm incident in a normal direction of the film in KOBRA 21ADH or WR (manufactured by Oji Scientific Instruments). In selecting the measuring wavelength λ nm, the measurement can be achieved by manually exchanging a wavelength selective filter or converting a measured value with a program, etc.

In the case where the film to be measured is expressed by a uniaxial or biaxial refractive index ellipsoid, the Rth (λ) is calculated in the following manner.

The Rth (λ) is calculated by KOBRA 21ADH or WR on the basis of six measured Re (λ) values, an assumed value of the average refractive index, and an inputted film thickness. The retardation Re (λ) values are measured such that light having a wavelength of λ nm is made incident to the film from six directions tilted to 50° on one side at intervals of 10° to the film normal line, using an in-plane slow axis (detected by KOBRA 21ADH or WR) as a tilt axis (rotation axis) (when the film has no slow axis, an arbitrary in-plane direction is used as the rotation axis).

In the foregoing, when a retardation value measured using the in-plane slow axis as the rotation axis is zero at a certain tilt angle to a normal line direction, the sign of a retardation value at a tilt angle larger than the foregoing certain tilt angle is converted to a negative sign, and the negative retardation value is then used in the calculation by KOBRA 21ADH or WR.

Incidentally, the Rth can also be calculated by the following expressions (11) and (12) on the basis of an assumed value of the average refractive index, an inputted thickness value, and two retardation values measured in arbitrary two tilt directions, using the slow axis as the tilt axis (the rotation axis) (when the film has no slow axis, an arbitrary in-plane direction is used as the rotation axis).

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Expression (11)

In the foregoing expression (11), Re (θ) represents a retardation value in a direction tilted at an angle θ to a film normal line direction.

In the expression (11), nx represents a refractive index in a slow axis direction in the plane; ny represents a refractive index in a direction orthogonal to nx in the plane; nz represents a refractive index in a direction orthogonal to nx and ny; and d represents a film thickness.

$$Rth = \{(nx+ny)/2 - nz\} \times d \quad \text{Expression (12)}$$

In the case where the film to be measured cannot be expressed in terms of a uniaxial or biaxial refractive index ellipsoid, and thus has no so-called optic axis, the Rth (λ) is calculated in the following manner.

The Rth (λ) is calculated by KOBRA 21ADH or WR on the basis of eleven measured Re (λ) values, an assumed value of the average refractive index, and an inputted film thickness value. The retardation Re (λ) values are measured such that light having a wavelength of λ nm is made incident to the film from eleven directions tilted at −50° to +500 at intervals of 10° to the film normal line direction, using an in-plane slow axis (detected by KOBRA 21ADH or WR) as a tilt axis (rotation axis).

In the foregoing measurements, as the assumed values of the average refractive indices, those described in *Polymer Handbook* (JOHN WILEY & SONS, INC.) and catalogs of various optical films can be used. Unknown average refractive indices may be obtained by measurement using an Abbe refractometer. The average refractive indices of major optical film materials are as follows: cellulose acylate (1.48), cycloolefin polymer (1.52), polycarbonate (1.59), polymethyl methacrylate (1.49), and polystyrene (1.59). The above values of nx, ny, and nz are calculated by KOBRA 21ADH or WR from the inputted assumed average refractive index and film thickness value. Nz is further calculated from thus obtained nx, ny, and nz according to an expression: Nz=(nx−nz)/(nx−ny).

It is preferable that the film has no Re, and in the case of |Re|≤5 nm, the film can be considered to have substantially no Re.

Also, it is preferable that Rth satisfies a relation of 50 nm<Rth<300 nm; and it is more preferable that Rth satisfies a relation of 65 nm≤Rth≤150 nm. When the film has such Rth, a thin-film C-plate with higher developability of Rth can be fabricated.

(Rth/d)

The film of the invention is one satisfying the following expression (4) and can make both slimming of the film and development of sufficient Rth compatible with each other and decrease the raw material costs.

$$1\times10^{-3} \leq Rth/d \leq 4\times10^{-3} \quad \text{Expression (4):}$$

In the expression (4), Rth represents a value of a retardation (unit: nm) in a film thickness direction at a wavelength of 590 nm; and d represents a film thickness (unit: μm).

Rth/d is preferably from $1.0\times10^{-3}$ to $4.0\times10^{-3}$, and more preferably from $1.5\times10^{-3}$ to $3.0\times10^{-3}$.

(Elastic Modulus)

In the film of the invention, the elastic modulus E' of the film satisfies the following expression (5).

$$3.8 \text{ GPa} < E' < 5.0 \text{ GPa} \quad \text{Expression (5):}$$

By using a film satisfying such physical properties, even when the film is made so as to have a large area, self-supporting properties are not impaired, and even in the case of using the film as a support of a laminate, it has favorable handling properties, and therefore, such is preferable.

The elastic modulus E' of the film is preferably exceeding 3.8 GPa and less than 5.0 GPa, and more preferably from 3.8 to 4.5 GPa.

Also, E' (TD)/E' (MD) that is a ratio of elastic modulus in the TD direction and the MD direction is preferably from 0.9 to 1.1, more preferably from 0.95 to 1.05, and especially preferably 1.0.

(Film Thickness)

Though a thickness of the film of the invention can be properly determined depending upon the kind of a polarizing plate to be used and the like, it is preferably from 25 to 65 μm, and more preferably from 35 to 60 μm. What the thickness of the film is not more than 65 μm is preferable because not only it is able to contribute to achievement of slimming by members, but the costs can be decreased due to a reduction of the use amount of raw materials.

(Layer Structure of Cellulose Acylate Film)

The film of the invention may be a single-layered film or may have a laminated structure of two or more layers. In particular, in the case where a substitution degree of the cellulose acylate is from 2.6 to 2.8, the film is preferably made of a single layer, and in the case where a substitution degree of the cellulose acylate is from 2.1 to 2.6, the film is preferably made of two or more layers. In the latter case, the film of the invention has a laminated structure of two or more layers, and it can be constituted in such a manner that a composition of each of the layers, such as an average total acyl substitution degree of the cellulose acylate contained therein and the content, is different from each other.

(Film Width)

A film width of the film of the invention is preferably 1,000 mm or more, more preferably 1,500 mm or more, and especially preferably 1,800 mm or more.

<Cellulose Acylate>

(Raw Material)

The cellulose acylate which is used in the invention is not particularly limited, except that it contains at least one cellulose acylate having a total acyl substitution degree of from 2.10 to 2.95. The cellulose acylate is preferably a cellulose acylate. Examples of the cellulose as an acylate raw material include cotton linter and wood pulps (for example, hardwood pulps, soft wood pulps, etc.), and cellulose acylates obtained from any of these raw material celluloses can be used. As the case may be, a mixture thereof may be used. These raw material celluloses are described in detail in, for example, *Course of Plastic Materials* (17): *Cellulose Resins* (written by Marusawa and Uda and published by The Nikkan Kogyo Shimbun, Ltd. (1970)); and *Journal of Technical Disclosure*, No. 2001-1745 (pages 7 to 8) by Japan Institute of Invention and Innovation.

First of all, the cellulose acylate which is preferably used in the invention is described in detail. A glucose unit having a β-1,4-bond, which constitutes the cellulose, has free hydroxyl groups at the 2-, 3- and 6-positions thereof. The cellulose acylate is a polymer obtained by esterifying a part or the whole of these hydroxyl groups with an acyl group having a carbon number of 2 or more. The acyl substitution degree means a proportion in which the hydroxyl groups of the cellulose located at the 2-, 3- and 6-positions are esterified (the esterification of 100% is a substitution degree of 1).

As the acyl group of the cellulose acylate which is used for the film of the invention, only one kind of an acyl group may be used, or two or more kinds of acyl groups may be used. When two or more kinds of acyl groups are used, one of the acyl groups is preferably an acetyl group, and an acyl group having a carbon number of from 2 to 4 is preferably a propionyl group or a butyryl group.

In the cellulose acylate in the invention, the acyl group having a carbon number of 2 or more other than an acetyl group may be either an aliphatic group or an aryl group, and it is not especially limited. Such is, for example, an alkyl carbonyl ester, an alkenyl carbonyl ester, an aromatic carbonyl ester, or an aromatic alkyl carbonyl ester, of cellulose, each of which may have a further substituted group. Preferred examples thereof include a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexanecarbonyl group, an oleoyl group, a benzoyl group, a naphthyl carbonyl group, and a cinnamoyl group. Of these, a propionyl group, a butanoyl group, a dodecanoyl group, an octadecanoyl group, a tert-butanoyl group, an oleoyl group, a benzoyl group, a naphthyl carbonyl group, and a cinnamoyl group are more preferable, with a propionyl group and a butanoyl group being especially preferable.

In the invention, from the standpoints of manufacturing adaptability and the like, it is preferable that the cellulose acylate is a cellulose acetate composed only of an acetyl group.

In the acylation of cellulose, when an acid anhydride or an acid chloride is used as an acylating agent, an organic acid, for example, acetic acid, methylene chloride, etc. is used as an organic solvent that is a reaction solvent.

With respect to a catalyst, in the case where the acylating agent is an acid anhydride, a protonic catalyst such as sulfuric acid is preferably used; and in the case where the acylating agent is an acid chloride (for example, $CH_3CH_2COCl$), a basic compound is used.

The most general industrial synthesis method of a mixed fatty acid ester of cellulose is a method for acylating cellulose with a mixed organic acid component containing a fatty acid corresponding to an acetyl group and other acyl group (for example, acetic acid, propionic acid, valeric acid, etc.) or an acid anhydride thereof.

The cellulose acylate which is used in the invention can be, for example, synthesized by a method described in JP-A-10-45804.

<Additive>

The film of the invention may contain various additives.

In the invention, high-molecular weight additives and low-molecular weight additives which are known as an additive of a cellulose acylate film can be widely adopted as the additive.

In the film of the invention, an addition amount of the additive is preferably from 1 to 35% by mass, more preferably from 2 to 25% by mass, and still more preferably from 4 to 15% by mass relative to the cellulose acylate. When the addition amount of the additive is 1% by mass or more, the film is easy to cope with changes in temperature and humidity, whereas when the addition amount of the additive is not more than 35% by mass, the film is hardly whitened, and furthermore, physical characteristics are excellent.

Here, the additive as referred to in the invention means a component which is added for the purposes of enhancing various functions of the cellulose acylate film of the invention, and the like. That is, impurities, the residual solvent, and the like are not the additive in the invention.

As the additive, additives, for example, plasticizers such as polycondensed ester, phthalic acid ester, and phosphoric acid ester based compounds; retardation adjusting agents (e.g., retardation developing agents and retardation reducing agent); deterioration (oxidation) inhibitors; ultraviolet ray absorbers; matting agents; organic acids (may also be a release accelerator); and sugar ester compounds, can be added.

The additive which can be used for the film of the invention is hereunder described in detail.

(Polycondensed Ester)

It is preferable that the polycondensed ester according to the invention is a polycondensed ester containing an aromatic ring. It is more preferable that the polycondensed ester is a mixture of at least one dicarboxylic acid having an aromatic ring (also called an aromatic dicarboxylic acid) and at least one aliphatic dicarboxylic acid, for example, it is preferable that it is obtained by a dicarboxylic acid having a carbon number of 5.5 or more and not more than 10.0 in average, and at least one aliphatic diol having an average carbon number of 2.5 or more and not more than 7.0.

The calculation of the average carbon number of an aliphatic dicarboxylic acid residue is performed individually for a dicarboxylic acid residue and a diol residue.

A value obtained by multiplying a composition ratio (molar fraction) of the dicarboxylic acid residue by a constituent carbon number is defined as the average carbon number. For example, in the case of being constituted of 50 mol % of each of an adipic acid residual and a phthalic acid residue, the average carbon number is 7.0.

The case of a diol residue is also the same. A value obtained through calculation by multiplying a composition ratio (molar fraction) of an aliphatic diol residue by a constituent carbon number is defined as the average carbon number of the aliphatic diol residue. For example, in the case of being constituted of 50 mol % of an ethylene glycol residue and 50 mol % of a 1,2-propanediol residue, the average carbon number is 2.5.

A number average molecular weight of the polycondensed ester is preferably from 700 to 2,500, more preferably from 700 to 1,500, and still more preferably from 700 to 1,200. In the invention, when the number average molecular weight of the polycondensed ester is 700 or more, the volatility is low, so that film failure or process contamination by evaporation under a high temperature condition at the time of stretching the cellulose ester film is hardly caused. Also, when the number average molecular weight of the polycondensed ester is not more than 2,500, the compatibility with the cellulose ester is high, so that bleedout at the time of film formation and at the time of heat stretching is hardly caused.

The number average molecular weight of the polycondensed ester of the invention can be measured and evaluated by means of gel permeation chromatography. In the case of a polyester polyol whose end is not sealed, the number average molecular weight can also be calculated from an amount of the hydroxyl group per weight (hereinafter referred to as "hydroxyl value"). The hydroxyl value is obtained by acetylating the polyester polyol and then measuring an amount (mg) of potassium hydroxide necessary for neutralizing excessive acetic acid.

In the present invention, an aliphatic dicarboxylic acid having a carbon number of 2 to 20, an aromatic dicarboxylic acid having a carbon number of 8 to 20, and the mixture thereof can be preferably used, and an aliphatic dicarboxylic acid having a carbon number of 4 to 20, an aromatic dicarboxylic acid having a carbon number of 8 to 20 are more preferable.

In addition, in the case where the dicarboxylic acid is a dicarboxylic acid which is a mixture of an aromatic dicarboxylic acid and an aliphatic dicarboxylic acid according to the invention, an average carbon number of the dicarboxylic acid is preferably 5.5 or more and not more than 10.0, and more preferably 5.6 or more and not more than 8.

When the average carbon number of the dicarboxylic acid is 5.5 or more, a polarizing plate having excellent durability can be obtained. When the average carbon number of the dicarboxylic acid is not more than 10, the compatibility with the cellulose ester is excellent, so that the generation of bleedout in a film formation process of the cellulose ester film can be suppressed.

The polycondensed ester according to the invention can be used as a plasticizer.

The aromatic dicarboxylic acid residue is contained in the polycondensed ester obtained from a diol and a dicarboxylic acid containing an aromatic dicarboxylic acid.

The residue as referred to in this specification is a partial structure of the polycondensed ester and represents a partial structure having a characteristic feature of a monomer which forms the polycondensed ester. For example, a dicarboxylic acid residue which is formed from a dicarboxylic acid HOOC—R—COOH is —OC—R—CO—.

A ratio of the aromatic dicarboxylic acid residue in the dicarboxylic acid residue of the polycondensed ester which is used in the invention is preferably 40 mol % or more, more preferably from 40 mol % to 95 mol %, still more preferably from 45 mol % to 70 mol %, and yet still more preferably from 50 mol % to 70 mol %.

When the ratio of the aromatic dicarboxylic acid residue of the polycondensed ester is mol % or more, a cellulose ester film having sufficient optical anisotropy is obtainable, and a polarizing plate having excellent durability is obtainable. Also, when the ratio of the aromatic dicarboxylic acid residue of the polycondensed ester is not more than 95 mol %, the compatibility with the cellulose ester is excellent, so that bleedout even at the time of film formation and at the time of heat stretching of the cellulose ester film can be made to occur hardly.

As the aromatic dicarboxylic acid which is used in the invention, for example, phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, 2,6-naphthalenedicarboxylic acid, and the like can be exemplified. Of these, phthalic acid, terephthalic acid, and 2,6-naphthalenedicarboxylic acid are preferable; phthalic acid and terephthalic acid are more preferable; and terephthalic acid is still more preferable.

In the polycondensed ester, the aromatic dicarboxylic acid residue is formed by the aromatic dicarboxylic acid which is used for mixing.

Specifically, the aromatic dicarboxylic acid residue preferably contains at least one of a phthalic acid residue, a terephthalic acid residue, and an isophthalic acid residue; more preferably contains at least one of a phthalic acid residue and a terephthalic acid residue; and still more preferably contains a terephthalic acid residue.

That is, when terephthalic acid is used as the aromatic dicarboxylic acid for mixing in the formation of a polycondensed ester, the compatibility with the cellulose ester is excellent, so that a cellulose ester film in which bleedout is hardly caused even at the time of film formation and at the time of heat stretching of the cellulose ester film can be formed. Also, the aromatic dicarboxylic acid may be used singly or in combination of two or more kinds thereof. In the case of using two kinds of aromatic dicarboxylic acids, it is preferable to use phthalic acid and terephthalic acid.

The joint use of two kinds of aromatic dicarboxylic acids of phthalic acid and terephthalic acid is preferable because the polycondensed ester can be softened at ordinary temperature, and handling is easy.

A content of the terephthalic acid residue in the dicarboxylic acid residue of the polycondensed ester is preferably from 40 mol % to 95 mol %, more preferably from 45 mol % to 70 mol %, and still more preferably from 50 mol % to 70 mol %.

When the ratio of the terephthalic acid residue is 40 mol % or more, a cellulose ester film exhibiting sufficient optical anisotropy is obtainable. Also, when the ratio of the terephthalic acid residue is not more than 95 mol %, the compatibility with the cellulose ester is excellent, so that bleedout even at the time of film formation and at the time of heat stretching of the cellulose ester film can be made to occur hardly.

The aliphatic dicarboxylic acid residue is contained in the polycondensed ester obtained from a diol and a dicarboxylic acid containing an aliphatic dicarboxylic acid.

Examples of the aliphatic dicarboxylic acid which is preferably used in the invention include oxalic acid, malonic acid, succinic acid, maleic acid, fumaric acid, glutaric acid, adipic acid, pimelic acid, suberic acid, azelaic acid, sebacic acid, dodecanedicarboxylic acid, and 1,4-cyclohexanedicarboxylic acid.

In the polycondensed ester, the aliphatic dicarboxylic acid residue is formed from the aliphatic dicarboxylic acid which is used for mixing.

In the case of the aliphatic dicarboxylic acid residue, an average carbon number is preferably 2 or more and not more than 10.0, more preferably from 4 to 8.0, and still more preferably from 4 to 6.0. When the average carbon number of the aliphatic dicarboxylic acid is not more than 6.0, a loss on heating of the compound can be reduced, and planar failure which is considered to be caused due to process contamination by bleedout at the time of drying a cellulose acylate web can be prevented from occurring. Also, what the average carbon number of the aliphatic dicarboxylic acid is 4 or more is preferable because compatibility is excellent, and the deposition of the polycondensed ester hardly occurs.

Specifically, it is preferable that a succinic acid residue is contained. In the case of using two kinds of dicarboxylic acid residues, it is preferable that a succinic acid residue and an adipic acid residue are contained.

That is, for mixing in forming a polycondensed ester, the aliphatic dicarboxylic acid may be used singly or in combination of two or more kinds thereof. In the case of using two kinds of aliphatic dicarboxylic acids, it is preferable to use succinic acid and adipic acid. In the case of using one kind of an aliphatic dicarboxylic acid, it is preferable to use succinic acid. In that case, the average carbon number of the diol residue can be adjusted to a desired value, and such is preferable from the standpoint of the compatibility with the cellulose ester.

In the invention, it is preferable to use two kinds or three kinds of dicarboxylic acids. In the case of using two kinds of dicarboxylic acids, it is preferable to use one kind of each of an aliphatic dicarboxylic acid and an aromatic dicarboxylic acid. In the case of three kinds of dicarboxylic acids, one kind of an aliphatic dicarboxylic acid and two kinds of aromatic dicarboxylic acids, or two kinds of aliphatic dicarboxylic acids and one kind of an aromatic dicarboxylic acid, can be used. This is because a value of the average carbon number of the dicarboxylic acid residue is easily adjusted, a content of the aromatic dicarboxylic acid residue can be made to fall within a preferred range, and durability of a polarizer can be enhanced.

The aliphatic diol residue is contained in the polycondensed ester obtained from an aliphatic diol and a dicarboxylic acid.

The residue as referred to in this specification is a partial structure of the polycondensed ester and represents a partial structure having a characteristic feature of a monomer which forms the polycondensed ester. For example, a diol residue which is formed from a diol HO—R—OH is —O—R—O—.

Examples of the diol which forms the polycondensed ester include an aromatic diol and an aliphatic diol, and it is preferable that the diol contains at least an aliphatic diol.

The polycondensed ester preferably contains an aliphatic diol residue having an average carbon number of 2.0 or more and not more than 7.0, and more preferably contains an aliphatic diol residue having an average carbon number of 2.0 or more and not more than 4.0, and particularly preferably contains an aliphatic diol residue having an average carbon number of 2.0 or more and not more than 3.0. When the average carbon number of the aliphatic diol residue is not more than 7.0, the compatibility with the cellulose ester does not become low; bleedout is hardly caused; a loss on heating of the compound does not excessively increase, and planar failure which is considered to be caused due to process contamination at the time of drying a cellulose acylate web is hardly caused. Also, when the average carbon number of the aliphatic diol residue is less than 2.0, the synthesis becomes difficult.

Examples of the aliphatic diol which is used in the invention include alkyl diols and alicyclic diols, for example, ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-diemthylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol, cyclohexanedimethanol, etc. It is preferable to use, as a mixture, one kind or two or more kinds of these aliphatic diols together with ethylene glycol.

The aliphatic diol is preferably at least one kind of ethylene glycol, 1,2-propanediol, and 1,3-propanediol, and especially preferably at least one kind of ethylene glycol and 1,2-propanediol. In the case of using two kinds of aliphatic diols, it is preferable to use ethylene glycol and 1,2-propanediol. By using 1,2-propanediol or 1,3-propanediol, crystallization of the polycondensed ester can be prevented from occurring.

In the polycondensed ester, the diol residue is formed by the diol.

The diol residue preferably contains at least one of an ethylene glycol residue, a 1,2-propanediol residue, and a 1,3-propanediol residue; and more preferably contains an ethylene glycol residue or a 1,2-propanediol residue.

In the aliphatic diol residue, a proportion of the ethylene glycol residue is preferably from 20 mol % to 100 mol %, and more preferably from 50 mol % to 100 mol %.

In the end of the polycondensed ester of the invention, the diol or carboxylic acid exists as it is without being sealed, or so-called sealing of the end may be carried out upon being allowed to stand to further react with a monocarboxylic acid or a monoalcohol.

The monocarboxylic acid which is used for sealing is preferably acetic acid, propionic acid, butanoic acid, or the like, more preferably acetic acid or propionic acid, and most preferably acetic acid. The monoalcohol which is used for sealing is preferably methanol, ethanol, propanol, isopropanol, butanol, isobutanol, or the like, and most preferably methanol.

When a carbon number of the monocarboxylic acid which is used in the end of the polycondensed ester is not more than 3, a loss on heating of the compound does not become large, and planar failure is not caused.

In the end of the polycondensed ester of the invention, it is more preferable that a diol residue exists as it is without being sealed, and it is still more preferable that sealing with acetic acid or propionic acid is performed.

It does not matter whether the both ends of the polycondensed ester according to the invention is sealed or unsealed.

In the case where the both ends of the condensate are unsealed, the polycondensed ester is preferably a polyester polyol.

As one of embodiments of the polycondensed ester according to the invention, there can be exemplified a polycondensed ester in which a carbon number of the aliphatic diol residue is 2.5 or more and not more than 7.0, and the both ends of the condensate are unsealed.

In the case where the both ends of the condensate are sealed, it is preferable to seal the both ends upon being allowed to react with a monocarboxylic acid. At that time, the both ends of the polycondensed ester are a monocarboxylic acid residue. The residue as referred to in this specification is a partial structure of the polycondensed ester and represents a partial structure having a characteristic feature of a monomer which forms the polycondensed ester. For example, a monocarboxylic acid residue which is formed from a monocarboxylic acid R—COOH is R—CO—. The monocarboxylic acid residue is preferably an aliphatic monocarboxylic acid residue, more preferably an aliphatic monocarboxylic acid residue having a carbon number of not more than 22, and still more preferably an aliphatic monocarboxylic acid residue having a carbon number of not more than 3. Also, the monocarboxylic acid residue is preferably an aliphatic monocarboxylic acid residue having a carbon number of 2 or more, and especially preferably an aliphatic monocarboxylic acid residue having a carbon number of 2.

As one of embodiments of the polycondensed ester according to the invention, there can be exemplified a polycondensed ester in which a carbon number of the aliphatic diol residue is 2.5 or more and not more than 7.0, and the both ends of the condensate are a monocarboxylic acid residue.

When the carbon number of the monocarboxylic acid residue in the both ends of the polycondensed ester is not more than 3, the volatility is lowered, a loss on heating of the polycondensed ester does not become large, and it is possible to reduce the generation of process contamination and the generation of planar failure.

That is, the monocarboxylic acid which is used for sealing is preferably an aliphatic monocarboxylic acid. The monocarboxylic acid is preferably an aliphatic monocarboxylic acid having a carbon number of from 2 to 22, more preferably an aliphatic monocarboxylic acid having a carbon number of from 2 to 3, and especially preferably an aliphatic monocarboxylic acid having a carbon number of 2.

For example, as the monocarboxylic acid, acetic acid, propionic acid, butanoic acid, and derivatives thereof, and so on are preferable; acetic acid and propionic acid are more preferable; and acetic acid is the most preferable.

The monocarboxylic acid which is used for sealing may be used in admixture of two or more kinds thereof.

It is preferable that the both ends of the polycondensed ester of the invention are sealed with acetic acid or propionic acid, and it is the most preferable that the both ends of the polycondensed ester are an acetyl ester residue (sometimes referred to as "acetyl residue") upon being sealed with acetic acid.

In the case where the both ends of polycondensed ester are sealed, the state at ordinary temperature is hard to become in a solid shape, handling becomes favorable, and a cellulose ester film having excellent humidity stability and durability of polarizing plate can be obtained.

Specific examples of the polycondensed ester according to the invention are hereunder described, but it should not be construed that the invention is limited thereto.

Specific examples of an aliphatic polymer plasticizer (PA) having a number average molecular weight of from 700 to 10,000 and having a repeating unit composed of an aliphatic dicarboxylic acid and an aliphatic diol and optionally, an aliphatic monocarboxylic acid or an aliphatic monoalcohol are hereunder described, but it should not be construed that the invention is limited thereto.

PA-1: A condensate composed of ethylene glycol/succinic acid (molar ratio: 1/1) (number average molecular weight: 1,100)

PA-2: A condensate composed of 1,3-propanediol/glutaric acid (molar ratio: 1/1) (number average molecular weight: 1,500)

PA-3: A condensate composed of 1,3-propanediol/adipic acid (molar ratio: 1/1) (number average molecular weight: 900)

PA-4: A condensate composed of 1,3-propanediol/ethylene glycol/adipic acid (molar ratio: 1/1/2) (number average molecular weight: 1,500)

PA-5: A condensate composed of 2-methyl-1,3-propanediol/adipic acid (molar ratio: 1/1) (number average molecular weight: 1,400)

PA-6: A condensate composed of ethylene glycol/succinic acid/adipic acid (molar ratio: 2/1/1) in which both ends thereof are acetyl-esterified (number average molecular weight: 1,000)

PA-7: A condensate composed of 1,4-cyclohexanediol/succinic acid (molar ratio: 1/1) (number average molecular weight: 1,800)

PA-8: A condensate composed of 1,3-propanediol/succinic acid (molar ratio: 1/1) in which both ends thereof are butyl-esterified (number average molecular weight: 1,200)

PA-9: A condensate composed of 1,3-propanediol/glutaric acid (molar ratio: 1/1) in which both ends thereof are cyclohexyl-esterified (number average molecular weight: 1,500)

PA-10: A condensate composed of ethylene glycol/succinic acid (molar ratio: 1/1) in which both ends thereof are acetyl-esterified (number average molecular weight: 3,000)

PA-11: A condensate composed of 1,3-propanediol/ethylene glycol/adipic acid (molar ratio: 1/1/2) in which both ends thereof are isononyl-esterified (number average molecular weight: 1,500)

PA-12: A condensate composed of 2-methyl-1,3-propanediol/adipic acid (molar ratio: 1/1) in which both ends thereof are propyl-esterified (number average molecular weight: 1,300)

PA-13: A condensate composed of 2-methyl-1,3-propanediol/adipic acid (molar ratio: 1/1) in which both ends thereof are acetyl-esterified (number average molecular weight: 1,700)

PA-14: A condensate composed of 2-methyl-1,3-propanediol/adipic acid (molar ratio: 1/1) in which both ends thereof are isononyl-esterified (number average molecular weight: 1,500)

PA-15: A condensate composed of 1,4-butanediol/adipic acid (molar ratio: 1/1) in which both ends thereof are butyl-esterified (number average molecular weight: 1,100)

PA-16: A condensate composed of polypropylene (average polymerization degree: 5) ether glycol/succinic acid (molar ratio: 1/1) (average molecular weight: 2,800)

PA-17: A condensate composed of polyethylene (average polymerization degree: 3) ether glycol/glutaric acid (molar ratio: 1/1) (average molecular weight: 2,300)

PA-18: A condensate composed of polypropylene (average polymerization degree: 4) ether glycol/adipic acid (molar ratio: 1/1) (average molecular weight: 2,200)

PA-19: A condensate composed of polypropylene (average polymerization degree: 5) ether glycol/succinic acid (molar ratio: 1/1) in which both ends thereof are butyl-esterified (average molecular weight: 1,900)

PA-20: A condensate composed of polyethylene (average polymerization degree: 3) ether glycol/glutaric acid (molar ratio: 1/1) in which both ends thereof are 2-ethylhexyl-esterified (average molecular weight: 2,500)

PA-21: A condensate composed of polypropylene (average polymerization degree: 4) ether glycol/adipic acid (molar ratio: 1/1) in which both ends thereof are acetyl-esterified (number average molecular weight: 1,500)

PA-22: A condensate composed of polypropylene (average polymerization degree: 4) ether glycol/phthalic acid (molar ratio: 1/1) in which both ends thereof are propionyl-esterified (number average molecular weight: 1,900)

PA-23: A condensate composed of ethylene glycol/adipic acid (molar ratio: 1/1) (number average molecular weight: 1,000)

With respect to the aliphatic diol which is used for an aromatic polymer plasticizer (PB), the aliphatic diol described in the foregoing aliphatic polymer plasticizer (PA) can be similarly utilized, and an alkyl ether diol having a carbon number of from 4 to 20 can be similarly used. Next, in the aromatic polymer plasticizer (PB), an aromatic ring-containing diol can also be used as the diol. The aromatic ring-containing diol is preferably at least one diol selected among aromatic diols having a carbon number of from 6 to 20. Examples thereof include bisphenol A, 1,2-hydroxybenzene, 1,3-dihydroxybenzene, 1,4-dihydroxybenzene, and benzene-1,4-dimethanol, with bisphenol A, 1,4-dihydroxybenzene, and benzene-1,4-dimethanol being preferable.

Furthermore, in the aromatic polymer plasticizer (PB), it is also preferable to use an aliphatic monocarboxylic acid, an aliphatic monoalcohol, an aromatic ring-containing monocarboxylic acid, or an aromatic ring-containing monoalcohol, as the case may be. In that case, with respect to the aliphatic monocarboxylic acid and the aliphatic monoalcohol, the aliphatic monocarboxylic and the aliphatic monoalcohol described above for the aliphatic polymer plasticizer (PA) can be utilized, and an alkyl ether diol having a carbon number of from 4 to 20 can be similarly used.

Alternatively, it is preferable that the aromatic ring-containing monoalcohol contains at least one member selected from an aromatic ring-containing group having a carbon number of from 6 to 20, an aliphatic carbonyl group having a carbon number of from 2 to 22, and an aromatic carbonyl group having from 7 to 20. Examples thereof include phenol, cresol, benzyl alcohol, phenyl ethanol, phenethyl alcohol, and 1-naphthyl alcohol, with benzyl alcohol and phenyl ethanol being preferable. Also, it is preferable that the aromatic ring-containing monocarboxylic acid contains at least one member selected from an aromatic ring-containing group having a carbon number of from 6 to 20, an aliphatic carbonyl group having a carbon number of from 2 to 22, and an aromatic carbonyl group having a carbon number of from 7 to 20. Examples thereof include benzoic acid, p-tert-butylbenzoic acid, p-tert-amylbenzoic acid, o-toluic acid, m-toluic acid, p-toluic acid, dimethylbenzoic acid, ethylbenzoic acid, n-propylbenzoic acid, aminobenzoic acid, acetoxybenzoic acid, phenylacetic acid, and cinnamic acid, with benzoic acid, phenylacetic acid, and cinnamic acid being preferable. These can be used singly or in combination of two or more kinds thereof.

Specific examples of the aromatic polymer plasticizer (PB) are hereunder described, but it should not be construed that the invention is limited thereto.

PB-1: A condensate composed of succinic acid/phthalic acid/ethylene glycol (molar ratio: 1/1/2) (number average molecular weight: 900)

PB-2: A condensate composed of glutaric acid/isophthalic acid/1,3-propanediol (molar ratio: 1/1/2) (number average molecular weight: 1,300)

PB-3: A condensate composed of adipic acid/terephthalic acid/1,2-propanediol (molar ratio: 1/1/2) (number average molecular weight: 1,200)

PB-4: A condensate composed of succinic acid/terephthalic acid/ethylene glycol/1,4-cyclohexanedimethanol (molar ratio: 1/1/1/1) (number average molecular weight: 3,000)

PB-5: A condensate composed of succinic acid/glutaric acid/adipic acid/terephthalic acid/isophthalic acid/ethylene glycol/1,2-propanediol (molar ratio: 1/1/1/1/1/3/2) (number average molecular weight: 2,500)

PB-6: A condensate composed of succinic acid/adipic acid/terephthalic acid/ethylene glycol/1,2-propanediol (molar ratio: 1/1/1/2/1) (number average molecular weight: 2,800)

PB-7: A condensate composed of succinic acid/adipic acid/1,4-naphthalenedicarboxylic acid/ethylene glycol/1,2-propanediol (molar ratio: 1/1/1/2/1) (number average molecular weight: 2,000)

PB-8: A condensate composed of succinic acid/terephthalic acid/polypropylene (average polymerization degree: 5) ether glycol/1,2-propanediol (molar ratio: 2/1/1/2) (number average molecular weight: 2,500)

PB-9: A condensate composed of succinic acid/terephthalic acid/polyethylene (average polymerization degree: 3) ether glycol/1,2-propanediol (molar ratio: 1/3/2/2) (number average molecular weight: 3,500)

PB-10: A condensate composed of succinic acid/terephthalic acid/ethylene glycol (molar ratio: 1/1/2) (number average molecular weight: 2,100) in which both ends thereof are acetyl-esterified PB-11: A condensate composed of glutaric acid/isophthalic acid/1,3-propanediol (molar ratio: 1/1/2) (number average molecular weight: 1,500) in which both ends thereof are cyclohexyl-esterified PB-12: A condensate composed of adipic acid/terephthalic acid/1,2-propanediol (molar ratio: 1/1/2) (number average molecular weight: 2,500) in which both ends thereof are 2-ethylhexyl-esterified PB-13: A condensate composed of succinic acid/terephthalic acid/ethylene glycol/1,4-cyclohexanedimethanol (molar ratio: 1/1/1/1) (number average molecular weight: 3,000) in which both ends thereof are isononyl-esterified PB-14: A condensate composed of succinic acid/glutaric acid/adipic acid/terephthalic acid/isophthalic acid/ethylene glycol/1,2-propanediol (molar ratio: 1/1/1/1/1/3/2) (number average molecular weight: 3,000) in which both ends thereof are propyl-esterified PB-15: A condensate composed of succinic acid/adipic acid/terephthalic acid/ethylene glycol/1,2-propanediol (molar ratio: 1/1/1/2/1) (number average molecular weight: 3,000) in which both ends thereof are 2-ethylhexyl-esterified PB-16: A condensate composed of succinic acid/adipic acid/1,4-naphthalenedicarboxylic acid/ethylene glycol/1,2-propanediol (molar ratio: 1/1/1/2/1) (number average molecular weight: 3,000) in which both ends thereof are benzoic acid-esterified PB-17: A condensate composed of succinic acid/terephthalic acid/polypropylene (average polymerization degree: 5) ether glycol/1,2-propanediol (molar ratio: 2/1/1/2) (number average molecular weight: 3,500) in which both ends thereof are 2-ethylhexyl-esterified PB-18: A condensate composed of succinic acid/terephthalic acid/polyethylene (average polymerization degree: 4) ether glycol/1,2-propanediol (molar ratio: 1/3/2/2) (number average molecular weight: 2,500) in which both ends thereof are 2-ethylhexyl-esterified PB-19: A condensate composed of succinic acid/phthalic acid/ethylene glycol (molar ratio: 1/1/2) (number average molecular weight: 2,500) in which both ends thereof are acetyl-esterified PB-20: A condensate composed of succinic acid/isophthalic acid/phthalic acid/terephthalic acid/ethylene glycol/1,3-propanediol (molar ratio: 1/1/1/1/2/2) (number average molecular weight: 1,300) in which both ends thereof are acetyl-esterified PB-21: A condensate composed of adipic acid/terephthalic acid/1,2-propanediol (molar ratio: 1/1/2) (number average molecular weight: 900) in which both ends thereof are benzoyl-esterified PB-22: A condensate composed of succinic acid/terephthalic acid/ethylene glycol/1,4-cyclohexanedimethanol (molar ratio: 1/1/1/1) (number average molecular weight: 3,000) in which both ends thereof are propionyl-esterified PB-23: A condensate composed of succinic acid/glutaric acid/adipic acid/terephthalic acid/isophthalic acid/ethylene glycol/1,2-propanediol (molar ratio: 1/1/1/1/1/2/3/3) (number average molecular weight: 2,500) in which both ends thereof are cyclohexanecarbonyl-esterified PB-24: A condensate composed of succinic acid/terephthalic acid/polyethylene (average polymerization degree: 3) ether glycol/1,2-propanediol (molar ratio: 1/3/2/2) (number average molecular weight: 2,500) in which both ends thereof are acetyl-esterified PB-25: A condensate composed of succinic acid/bisphenol A (molar ratio: 1/1) (number average molecular weight: 2,000)

PB-26: A condensate composed of succinic acid/terephthalic acid/ethylene glycol/bisphenol A (molar ratio: 2/1/1/2) (number average molecular weight: 2,500)

PB-27: A condensate composed of succinic acid/2,6-naphthalenedicarboxylic acid/bisphenol A/propanediol (molar ratio: 1/2/2/1) (number average molecular weight: 1,900)

PB-28: A condensate composed of succinic acid/adipic acid/2,6-naphthalenedicarboxylic acid/bisphenol A/diethylene glycol (molar ratio: 1/1/2/2/2) (number average molecular weight: 2,500)

PB-29: A condensate composed of succinic acid/terephthalic acid/ethylene glycol/bisphenol A (molar ratio: 1/2/1/2) (number average molecular weight: 2,500) in which both ends thereof are 2-ethylhexyl-esterified PB-30: A condensate composed of succinic acid/2,6-naphthalenedicarboxylic acid/bisphenol A/propanediol (molar ratio: 1/2/2/1) (number average molecular weight: 2,300) in which both ends thereof are 2-ethylhexyl-esterified PB-31: A condensate composed of succinic acid/bisphenol A (molar ratio: 1/1) (number average molecular weight: 2,200) in which both ends thereof are acetyl-esterified PB-32: A condensate composed of succinic acid/adipic acid/phthalic acid/terephthalic acid/ethylene glycol (molar ratio: 5/5/1/9/20) (number average molecular weight: 800) in which both ends thereof are acetyl-esterified PB-33: A condensate composed of adipic acid/phthalic acid/terephthalic acid/ethylene glycol (molar ratio: 10/1/9/20) (number average molecular weight: 800) in which both ends thereof are acetyl-esterified PB-34: A condensate composed of adipic acid/phthalic acid/terephthalic acid/ethylene glycol (molar ratio: 5/2/3/10) (number average molecular weight: 1,000) in which both ends thereof are acetyl-esterified PB-35: A condensate composed of succinic acid/adipic acid/phthalic acid/ethylene glycol (molar ratio: 1/1/2/4) (number average molecular weight: 1,000) in which both ends thereof are acetyl-esterified The polycondensed ester according to the invention can be easily synthesized by any method of a hot melt condensation method by a polyesterification reaction or an ester interchange reaction between a diol and a dicarboxylic acid, or an interfacial condensation method between an acid chloride of such an acid and a glycol in the usual way. Also, the polycondensed ester according to the invention is described in detail in Koichi Murai Ed., *Plasticizer—Theory and Application* (the First Edition, the First Print, published by Saiwai Shobo, Mar. 1, 1973). Also, raw materials described in JP-A-05-155809, JP-A-05-155810, JP-A-5-197073, JP-A-2006-259494, JP-A-07-330670, JP-A-2006-342227, JP-A-2007-003679, and the like can be utilized.

A content of the polycondensed ester in the cellulose ester film is preferably from 5 to % by mass, more preferably from 8 to 30% by mass, and most preferably from 10 to 25% by mass relative to the amount of the cellulose ester.

A content of the raw material which is contained in the polycondensate of the invention, such as an aliphatic diol, a dicarboxylic acid ester, or a diol ester, in the cellulose ester film is preferably less than 1% by mass, and more preferably less and 0.5% by mass. Examples of the dicarboxylic acid ester include dimethyl phthalate, di(hydroxyethyl) phthalate, dimethyl terephthalate, di(hydroxyethyl) terephthalate, di(hydroxyethyl) adipate, and di(hydroxyethyl) succinate. Examples of the diol ester include ethylene diacetate and propylene diacetate.

The kind and ratio of each of the residues including the dicarboxylic acid residue, the diol residue, and the monocarboxylic acid residue, which are contained in the polycondensed ester to be used in the invention, can be measured by a usual method by means of H-NMR. In general, deuterochloroform can be used as a solvent.

The number average molecular weight of the polycondensed ester can be measured by a usual method by means of GPC (gel permeation chromatography). In general, polystyrene can be used as a standard sample.

The hydroxyl value of the polycondensed ester can be measured according to an acetic anhydride method described in Japanese Industrial Standards, JIS K3342 (obsolete) or the like. In the case where the polycondensate is a polyester polyol, its hydroxyl value is preferably 50 or more and not more than 190, and more preferably 50 or more and not more than 130.

(Plasticizer Other than the Polycondensed Ester)

As the plasticizer which is used in the invention, besides the foregoing polycondensed ester, a lot of compounds which are known as a plasticizer of cellulose acylates and which when added, are able to impart plasticity can be usefully used. As the plasticizer other than the polycondensed ester, compounds such as phosphates, carboxylates, and sugar esters are useful. Examples of the phosphate include triphenyl phosphate (TPP) and tricresyl phosphate (TCP). The carboxylate is typically a phthalate and a citrate. Examples of the phthalate include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citrate include triethyl O-acetylcitrate (OACTE) and tributyl O-acetylcitrate (OACTB). Examples of other carboxylate include butyl oleate, methylacetyl ricinoleate, dibutyl sebacate, and various trimellitates. Phthalate based plasticizers (e.g., DMP, DEP, DBP, DOP, DPP, DEHP) are preferably used. DEP and DPP are especially preferable.

(Sugar Ester Compound)

—Sugar Residue—

The sugar ester compound as referred to herein means a compound in which at least one group which can be substituted in a polysaccharide constituting the subject compound (for example, a hydroxyl group or a carboxyl group) and at least one substituent are ester-bonded to each other. That is, in the sugar ester compound as referred to herein, sugar derivatives are also included in a broad sense, and for example, compounds containing a sugar residue such as gluconic acid as a structure are included, too. That is, in the sugar ester compound, esters between glucose and a carboxylic acid and esters between gluconic acid and an alcohol are included, too.

The group which can be substituted in a polysaccharide constituting the sugar ester compound is preferably a hydroxyl group.

In the sugar ester compound, a structure derived from a polysaccharide constituting the sugar ester compound (hereinafter also referred to as "sugar residue") is contained. The structure of the sugar residue per monosaccharide is called a structural unit of the sugar ester compound. It is preferable that the structural unit of the sugar ester compound contains a pyranose structure unit or a furanose structural unit, and it is more preferable that all of the sugar residues are a pyranose structural unit or a furanose structural unit. Also, in the case where the sugar ester is constituted of a polysaccharide, it is preferable to contain a pyranose structural unit or a furanose structural unit jointly.

Though the sugar residue of the sugar ester compound may be derived from a pentasaccharide, or may be derived from a hexasaccharide, it is preferably derived from a hexasaccharide.

A number of structural units contained in the sugar ester compound is preferably from 2 to 4, more preferably from 2 to 3, and especially preferably 2. That is, the sugar constituting the sugar ester compound is preferably a disaccharide, a trisaccharide, or a tetrasaccharide; more preferably a disaccharide or a trisaccharide; and especially preferably a disaccharide.

In the invention, the sugar ester compound is preferably a sugar ester compound containing from 2 to 4 pyranose structural units or furanose structural units in which at least one of hydroxyl groups is esterified, and more preferably a sugar ester compound containing two pyranose structural units or furanose structural units in which at least one of hydroxyl groups is esterified.

Examples of the monosaccharide or the sugar containing from 2 to 4 monosaccharide unit include erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, baltopentaose, belbalcose, maltohexaose, xylitol, and sorbitol.

Of these, ribose, arabinose, xylose, lyxose, glucose, fructose, mannose, galactose, trehalose, maltose, cellobiose, lactose, sucrose, sucralose, xylitol, and sorbitol are preferable; arabinose, xylose, glucose, fructose, mannose, galactose, maltose, cellobiose, and sucrose are more preferable; and xylose, glucose, fructose, mannose, galactose, maltose, cellobiose, sucrose, xylitol, and sorbitol are especially preferable.

Preferred examples of the substituent of the sugar ester compound include an alkyl group (preferably an alkyl group having a carbon number of from 1 to 22, more preferably an alkyl group having a carbon number of from 1 to 12, and especially preferably an alkyl group having a carbon number of from 1 to 8; for example, a methyl group, an ethyl group, a propyl group, a hydroxyethyl group, a hydroxypropyl group, a 2-cyanoethyl group, a benzyl group, etc.), an aryl group (preferably an aryl group having a carbon number of from 6 to 24, more preferably an aryl group having a carbon number of from 6 to 18, and especially preferably an aryl group having a carbon number of from 6 to 12; for example, a phenyl group, a naphthyl group, etc.), an acyl group (preferably an acyl group having a carbon number of from 1 to 22, more preferably an acyl group having a carbon number of from 2 to 12, and especially preferably an acyl group having a carbon number of from 2 to 8; for example, an acetyl group, a propionyl group, a butyryl group, a pentanoyl group, a hexanoyl group, an octanoyl group, a benzoyl group, a toluoyl group, a phthalyl group, etc.), an amide group (preferably an amide group having a carbon number of from 1 to 22, more preferably an amide group having a carbon number of from 2 to 12, and especially preferably an amide group having a carbon number of from 2 to 8; for example, a formamide group, an acetamide group, etc.), and an imide group (preferably an imide group having a carbon number of from 4 to 22, more preferably an imide group having a carbon number of from 4 to 12, and especially preferably an imide group having a carbon number of from 4 to 8; for example, a succinimide group, a phthalimide group, etc.). Of these, an alkyl group and an acyl group are more preferable; and a methyl group, an acetyl group, and a benzoyl group are more preferable. The substituent is especially preferably at least one of a benzoyl group and an acetyl group, with a benzoyl group being more specifically preferable.

Specific examples of the sugar ester compound which can be used in the invention are hereunder described, but it should not be construed that the invention is limited thereto. Also, though an ester substitution degree of each of the sugar ester compounds in the following specific examples is not described, the sugar ester compound may be used as a mixture of sugar ester compounds using sugar ester compounds having an arbitrary ester substitution degree so far as the gist of the invention is not deviated.

In the following structural formulae, each of R independently represents a hydrogen atom or an arbitrary substituent. A plurality of R may be same or different. In the following structures, each of substituent 1, and substituent 2 represents an arbitrary R. Moreover, substitution degree represents a number wherein R is represented by the substituent. "No" means that R is a hydrogen atom.

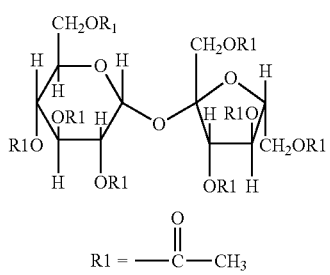

Compound 1

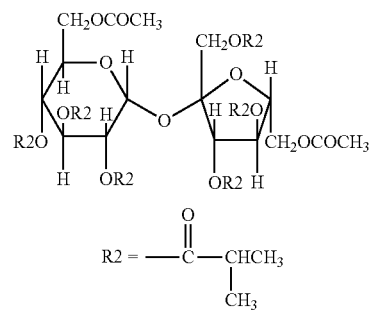

Compound 2

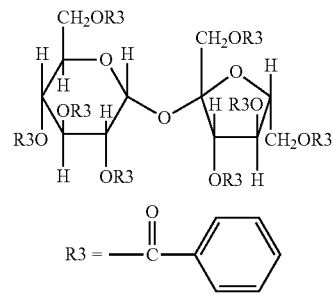

Compound 3

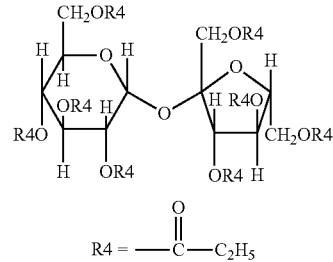

Compound 4

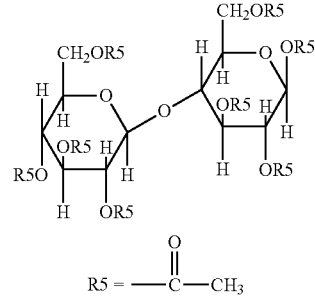

Compound 5

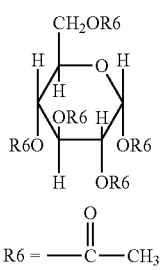

Compound 6

Compound 7
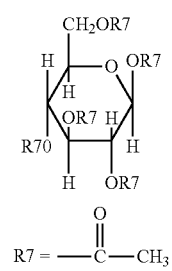
Compound 8
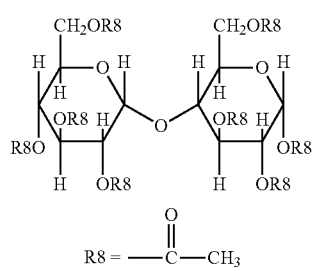
Compound 9
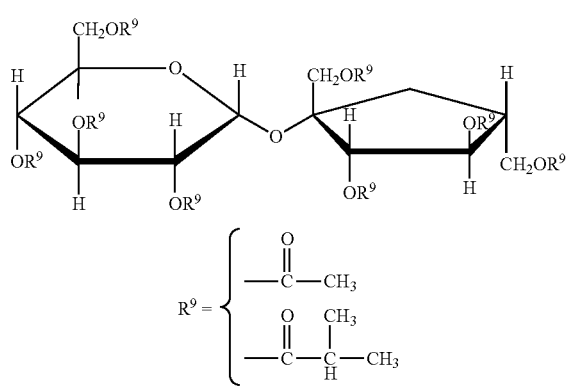
Compound 10
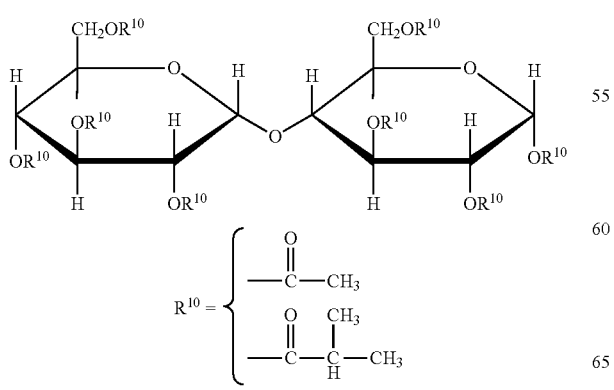
Compound 11
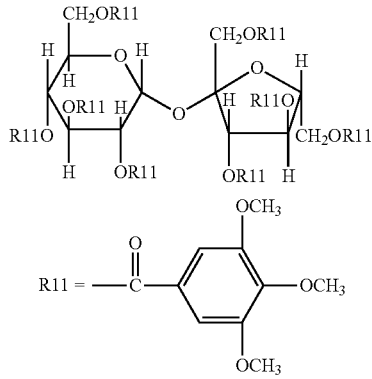
Compound 12
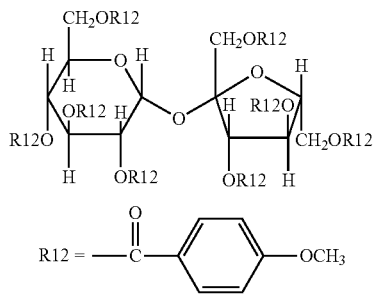
Compound 13
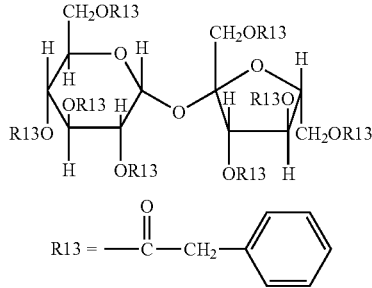
Compound 14
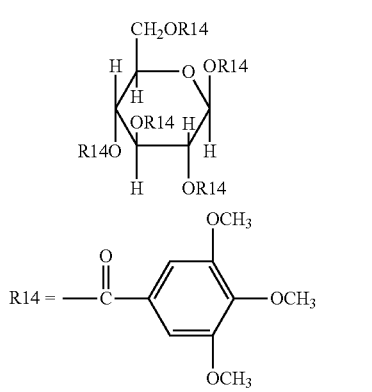
Compound 15
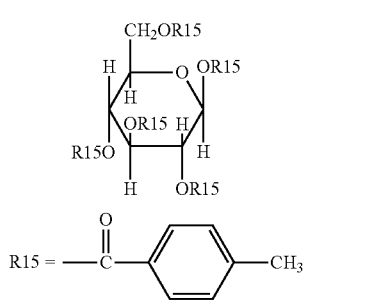

-continued

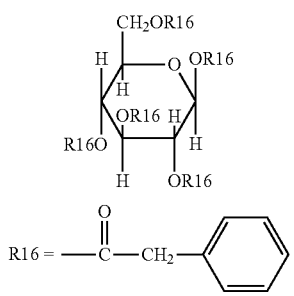

Compound 16

In the following structural formulae, each R independently represents an arbitrary substituent, and each R may be the same as or different from every other R.

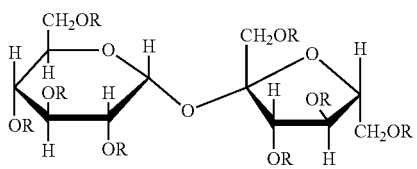

TABLE 1

| Compound | Substituent 1 | | Substituent 2 | | Molecular weight |
|---|---|---|---|---|---|
| | Kind | Substitution degree | Kind | Substitution degree | |
| 101 | Acetyl | 7 | Benzyl | 1 | 727 |
| 102 | Acetyl | 6 | Benzyl | 2 | 775 |
| 103 | Acetyl | 7 | Benzoyl | 1 | 741 |
| 104 | Acetyl | 6 | Benzoyl | 2 | 802 |
| 105 | Benzyl | 2 | No | 0 | 523 |
| 106 | Benzyl | 3 | No | 0 | 613 |
| 107 | Benzyl | 4 | No | 0 | 702 |
| 108 | Acetyl | 7 | Phenyl Acetyl | 1 | 771 |
| 109 | Acetyl | 6 | Phenyl Acetyl | 2 | 847 |
| 110 | Benzoyl | 1 | No | — | 446 |
| 111 | Benzoyl | 2 | No | — | 550 |
| 112 | Benzoyl | 3 | No | — | 654 |
| 113 | Benzoyl | 4 | No | — | 758 |
| 114 | Benzoyl | 5 | No | — | 862 |
| 115 | Benzoyl | 6 | No | — | 966 |
| 116 | Benzoyl | 7 | No | — | 1070 |
| 117 | Benzoyl | 8 | No | — | 1174 |

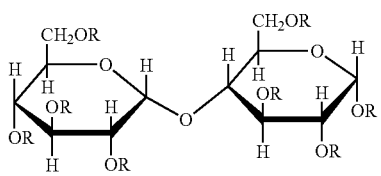

TABLE 2

| Compound | Substituent 1 | | Substituent 2 | | Molecular weight |
|---|---|---|---|---|---|
| | Kind | Substitution degree | Kind | Substitution degree | |
| 301 | Acetyl | 6 | Benzoyl | 2 | 803 |
| 302 | Acetyl | 6 | Benzyl | 2 | 775 |
| 303 | Acetyl | 6 | Phenyl Acetyl | 2 | 831 |
| 304 | Benzoyl | 2 | No | 0 | 551 |
| 305 | Benzyl | 2 | No | 0 | 522 |
| 306 | Phenyl Acetyl | 2 | No | 0 | 579 |

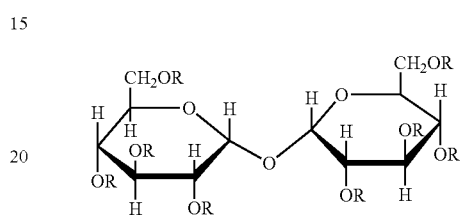

TABLE 3

| Compound | Substituent 1 | | Substituent 2 | | Molecular weight |
|---|---|---|---|---|---|
| | Kind | Substitution degree | Kind | Substitution degree | |
| 401 | Acetyl | 6 | Benzoyl | 2 | 803 |
| 402 | Acetyl | 6 | Benzyl | 2 | 775 |
| 403 | Acetyl | 6 | Phenyl Acetyl | 2 | 831 |
| 404 | Benzoyl | 2 | No | 0 | 551 |
| 405 | Benzyl | 2 | No | 0 | 523 |
| 406 | Phenyl Acetyl | 2 | No | 0 | 579 |

Furthermore, as the sugar ester compound, sugar ester compounds described in JP-A-2001-247717, JP-T-2005-515285, WO2007/125764, WO2009/011228, WO2009/031464, etc. can also be used.

As for an acquisition method of the sugar ester compound, marketed products are commercially available from Tokyo Chemical Industry Co., Ltd., Aldrich, and the like, or the sugar ester compound can be synthesized by subjecting a commercially available carbide to an already-known ester derivation method (for example, a method described in JP-A-8-245678).

A number average molecular weight of the sugar ester compound is preferably in the range of from 200 to 3,500, more preferably in the range of from 420 to 3,000, and especially preferably in the range of from 450 to 2,000.

A content of the sugar ester compound is preferably from 2 to 30% by mass, and more preferably from 5 to 20% by mass relative to the cellulose acylate.

(Retardation Developing Agent)

In order to develop a retardation value, the film of the invention may contain a retardation developing agent, and a content of the retardation developing agent is not more than 8% by mass relative to the cellulose acylate. Though the retardation developing agent is not particularly limited, examples thereof include those made of a rod-shaped or disc-shaped compound. As the rod-shaped or disc-shaped compound, a compound having at least two aromatic rings can be preferably used as the retardation developing agent.

An addition amount of the retardation developing agent made of a rod-shaped compound is preferably not more than 8 parts by mass, and more preferably not more than 5 parts by mass based on 100 parts by mass of the cellulose acylate component. An amount of the disc-shaped compound which is contained in the retardation developing agent is preferably not more than 8 parts by mass, more preferably not more than 5 parts by mass, and especially preferably not more than 4 parts by mass, based on 100 parts by mass of the cellulose acylate.

From the standpoint of Rth retardation developability, the disc-shaped compound is more excellent than the rod-shaped compound, and therefore, in particular, in the case where a large Rth retardation is required, the disc-shaped compound is preferably used. Two or more kinds of retardation developing agents may be used jointly.

It is preferable that the retardation developing agent has maximum absorption in a wavelength region of from 250 to 400 nm; and it is preferable that the retardation developing agent does not substantially have absorption in a visible region.

The disc-shaped compound is hereunder described. As the disc-shaped compound, a compound having at least two aromatic rings can be used.

In this specification, the "aromatic ring" includes, in addition to an aromatic hydrocarbon ring, an aromatic heterocycle.

The aromatic hydrocarbon ring is especially preferably a 6-membered ring (namely, a benzene ring).

The aromatic heterocycle is in general an unsaturated heterocycle. The aromatic heterocycle is preferably a 5-membered ring, a 6-membered ring, or a 7-membered ring, and more preferably a 5-membered ring or a 6-membered ring. The aromatic heterocycle generally has the most double bonds. The hetero atom is preferably a nitrogen atom, an oxygen atom, or a sulfur atom, and especially preferably a nitrogen atom. Examples of the aromatic heterocycle include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyran ring, a pyridine ring, a pyridazine ring, a pyrimidine ring, a pyrazine ring, and a 1,3,5-triazine ring.

As the aromatic ring, a benzene ring, a fused benzene ring, and a biphenyl ring are preferable. A 1,3,5-triazine ring is especially preferably used. Specifically, compounds disclosed in, for example, JP-A-2001-166144 are preferably used.

A carbon number of the aromatic ring which the retardation developing agent has is preferably from 2 to 20, more preferably from 2 to 12, still more preferably from 2 to 8, and most preferably from 2 to 6.

A bonding relationship between the two aromatic rings can be classified into (a) the case where the two aromatic rings form a fused ring; (b) the case where the two aromatic rings are directly bonded to each other via a single bond; and (c) the case where the two aromatic rings are bonded to each other via a connecting group (because of the aromatic rings, a spiro bond cannot be formed). The bonding relationship may be any of the foregoing (a) to (c).

Examples of the fused ring (a) (a fused ring of two or more aromatic rings) include an indene ring, a naphthalene ring, an azulene ring, a fluorene ring, a phenanthrene ring, an anthracene ring, an acenaphthylene ring, a biphenylene ring, a naphthacene ring, a pyrene ring, an indole ring, an isoindole ring, a benzofuran ring, a benzothiophene ring, an indolizine ring, a benzoxazole ring, a benzothiazole ring, a benzimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxanthiine ring, a phenoxazine ring, and a thianthrene ring. Of these, a naphthalene ring, an azulene ring, an indole ring, a benzoxazole ring, a benzothiazole ring, a benzimidazole ring, a benzotriazole ring, and a quinoline ring are preferable.

The single bond (b) is preferably a bond between carbon atoms of the two aromatic rings. The two aromatic rings may be taken together via two or more single bonds, thereby forming an aliphatic ring or a non-aromatic heterocycle between the two aromatic rings.

It is preferable that the connecting group (c) bonds to the carbon atoms of the two aromatic rings, too. The connecting group is preferably an alkylene group, an alkenylene group, an alkynylene group, —CO—, —O—, —NH—, —S—, or a combination thereof. Examples of the connecting group which is composed of a combination are hereunder described. Incidentally, the left and right relationship in the following examples of the connecting group may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkynylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- Each of the aromatic ring and the connecting group may have a substituent.

Examples of the substituent include a halogen atom (for example, F, Cl, Br, and I), a hydroxyl group, a carboxyl group, a cyano group, an amino group, a nitro group, a sulfo group, a carbamoyl group, a sulfamoyl group, a ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfonamide group, an aliphatic substituted amino group, an aliphatic substituted carbamoyl group, an aliphatic substituted sulfamoyl group, an aliphatic substituted ureido group, and a non-aromatic heterocyclic group.

A carbon atom number of the alkyl group is preferably from 1 to 8. A chain alkyl group is more preferable than a cyclic alkyl group, and a straight chain alkyl group is especially preferable. The alkyl group may further have a substituent (for example, a hydroxyl group, a carboxyl group, an alkoxy group, and an alkyl-substituted amino group). Examples of the alkyl group (including the substituted alkyl group) include a methyl group, an ethyl group, an n-butyl group, an n-hexyl group, a 2-hydroxyethyl group, a 4-carboxybutyl group, a 2-methoxyethyl group, and a 2-diethylaminoethyl group.

A carbon atom number of the alkenyl group is preferably from 2 to 8. A chain alkenyl group is more preferable than a cyclic alkenyl group, and a straight chain alkenyl group is especially preferable. The alkenyl group may further have a substituent. Examples of the alkenyl group include a vinyl group, an allyl group, and a 1-hexenyl group.

A carbon atom number of the alkynyl group is preferably from 2 to 8. A chain alkynyl group is more preferable than a cyclic alkynyl group, and a straight chain alkynyl group is especially preferable. The alkynyl group may further have a substituent. Examples of the alkynyl group include an ethynyl group, a 1-butynyl group, and a 1-hexynyl group.

A carbon atom number of the aliphatic acyl group is preferably from 1 to 10. Examples of the aliphatic acyl group include an acetyl group, a propanoyl group, and a butanoyl group.

A carbon atom number of the aliphatic acyloxy group is preferably from 1 to 10. Examples of the aliphatic acyloxy group include an acetoxy group.

A carbon atom number of the alkoxy group is preferably from 1 to 8. The alkoxy group may further have a substituent (for example, an alkoxy group). Examples of the alkoxy group (including the substituted alkoxy group) include a methoxy group, an ethoxy group, a butoxy group, and a methoxyethoxy group.

A carbon atom number of the alkoxycarbonyl group is preferably from 2 to 10. Examples of the alkoxycarbonyl group include a methoxycarbonyl group and an ethoxycarbonyl group.

A carbon atom number of the alkoxycarbonylamino group is preferably from 2 to 10. Examples of the alkoxycarbonylamino group include a methoxycarbonylamino group and an ethoxycarbonylamino group.

A carbon atom number of the alkylthio group is preferably from 1 to 12. Examples of the alkylthio group include a methylthio group, an ethylthio group, and an octylthio group.

A carbon atom number of the alkylsulfonyl group is preferably from 1 to 8. Examples of the alkylsulfonyl group include a methanesulfonyl group and an ethanesulfonyl group.

A carbon atom number of the aliphatic amide group is preferably from 1 to 10. Examples of the aliphatic amide group include an acetamide group.

A carbon atom number of the aliphatic sulfonamide group is preferably from 1 to 8. Examples of the aliphatic sulfonamide group include a methanesulfonamide group, a butanesulfonamide group, and an n-octanesulfonamide group.

A carbon atom number of the aliphatic substituted amino group is preferably from 1 to 10. Examples of the aliphatic substituted amino group include a dimethylamino group, a diethylamino group, and a 2-carboxyethylamino group.

A carbon atom number of the aliphatic substituted carbamoyl group is preferably from 2 to 10. Examples of the aliphatic substituted carbamoyl group include a methylcarbamoyl group and a diethylcarbamoyl group.

A carbon atom number of the aliphatic substituted sulfamoyl group is preferably from 1 to 8. Examples of the aliphatic substituted sulfamoyl group include a methylsulfamoyl group and a diethylsulfamoyl group.

A carbon atom number of the aliphatic substituted ureido group is preferably from 2 to 10. Examples of the aliphatic substituted ureido group include a methylureido group.

Examples of the non-aromatic heterocyclic group include a piperidino group and a morpholino group.

It is preferable that the retardation developing agent has a molecular weight of from 300 to 800.

It is preferable to use a triazine compound represented by the following general formula (1) as the disc-shaped compound.

General Formula (I):

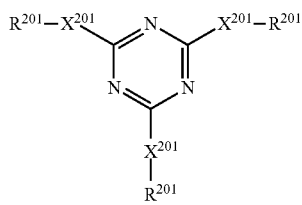

In the foregoing general formula (1), each $R^{201}$ independently represents an aromatic ring or a heterocycle having a substituent at least at any one of the ortho-position, meta-position and para-position; and each $X^{201}$ independently represents a single bond or —$NR^{202}$—, wherein each $R^{202}$ independently represents a hydrogen atom, a substituted or unsubstituted alkyl group, a substituted or unsubstituted alkenyl group, a substituted or unsubstituted aryl group, or a substituted or unsubstituted heterocyclic group.

The aromatic ring represented by $R^{201}$ is preferably phenyl or naphthyl, and especially preferably phenyl. The aromatic ring represented by $R^{201}$ may have at least one substituent at any one of substitution positions thereof. Examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group; a sulfamoyl group, an alkyl-substituted sulfamoyl group, an alkenyl-substituted sulfamoyl group, an aryl-substituted sulfamoyl group, a sulfonamide group, a carbamoyl group, an alkyl-substituted carbamoyl group, an alkenyl-substituted carbamoyl group, an aryl-substituted carbamoyl group, an amide group, an alkylthio group, an alkenylthio group, an arylthio group, and an acyl group.

It is preferable that the heterocyclic group represented by $R^{201}$ has aromatic properties. The heterocycle having aromatic properties is in general an unsaturated heterocycle, and preferably a heterocycle having the most double bonds. The heterocycle is preferably a 5-membered ring, a 6-membered ring, or a 7-membered ring, more preferably a 5-membered ring or a 6-membered ring, and most preferably a 6-membered ring. The hetero atom of the heterocycle is preferably a nitrogen atom, a sulfur atom, or an oxygen atom, and especially preferably a nitrogen atom. The heterocycle having aromatic properties is especially preferably a pyridine ring (2-pyridyl or 4-pyridyl as the heterocyclic ring). The heterocyclic group may have a substituent. Examples of the substituent of the heterocyclic ring are the same as those in the substituent of the foregoing aryl moiety.

When $X^{201}$ represents a single bond, the heterocyclic ring is preferably a heterocyclic ring having a free valence on a nitrogen atom. The heterocyclic group having a free valence on a nitrogen atom is preferably a 5-membered ring, a 6-membered ring, or a 7-membered ring, more preferably a 5-membered ring or a 6-membered ring, and most preferably a 5-membered ring. The heterocyclic group may have plural nitrogen atoms. Also, the heterocyclic group may have a hetero atom other than the nitrogen atom (for example, O and S). Examples of the heterocyclic group having a free valence on a nitrogen atom are hereunder described. Here, —$C_4H_9''$ represents n-$C_4H_9$.

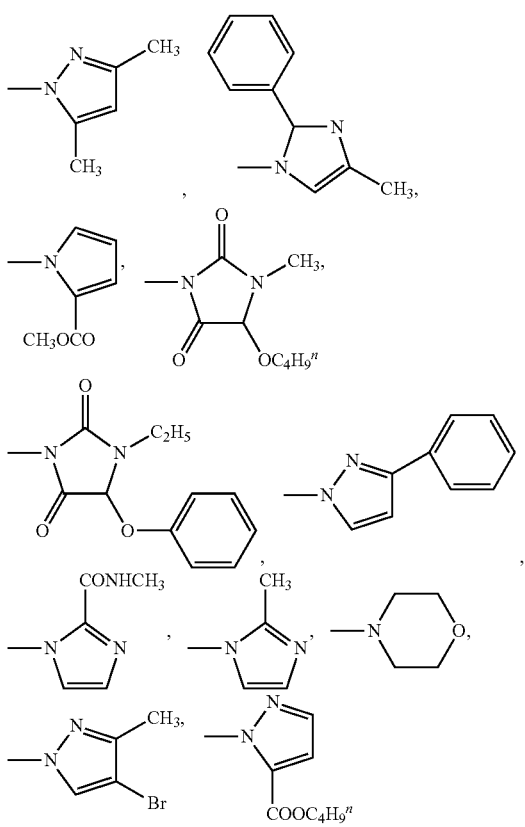

Though the alkyl group represented by $R^{202}$ may be a cyclic alkyl group or a chain alkyl group, it is preferably a chain alkyl group. A straight chain alkyl group is more preferable than a branched, chain alkyl group. A carbon atom number of the alkyl group is preferably from 1 to 30, more preferably from 1 to 20, still more preferably from 1 to 10, yet still more preferably from 1 to 8, and most preferably from 1 to 6. The alkyl group may have a substituent. Examples of the substituent include a halogen atom, an alkoxy group (for example, a methoxy group and an ethoxy group), and an acyloxy group (for example, an acryloyloxy group and a methacryloyloxy group).

Though the alkenyl group represented by $R^{202}$ may be a cyclic alkenyl group or a chain alkenyl group, it is preferably a chain alkenyl group. A straight chain alkenyl group is more preferable than a branched, chain alkenyl group. A carbon atom number of the alkenyl group is preferably from 2 to 30, more preferably from 2 to 20, still more preferably from 2 to 10, yet still more preferably from 2 to 8, and most preferably from 2 to 6. The alkenyl group may have a substituent. Examples of the substituent are the same as those in the substituent of the foregoing alkyl group.

The aromatic ring group and the heterocyclic group represented by $R^{202}$ are the same as those in the aromatic ring and the heterocycle represented by $R^{201}$, and preferred ranges are also the same. Each of the aromatic ring group and the heterocyclic group may further have a substituent, and examples of the substituent are the same as those in the substituent of each of the aromatic ring group and the heterocycle represented by $R^{201}$.

The compound represented by the general formula (1) can be synthesized by a known method, for example, a method described in JP-A-2003-344655. Details of the retardation developing agent are described on page 49 of *Journal of Technical Disclosure*, No. 2001-1745 by Japan Institute of Invention and Innovation.

As the retardation developing agent of the invention, similar to the foregoing low-molecular weight compound, a polymer based additive can also be used. Here, the polymer which is used as the polycondensed ester in the invention may also function as the retardation developing agent. As the polymer based retardation developing agent that is also the polycondensed ester, the foregoing aromatic polyester based polymer and a copolymer of the foregoing aromatic polyester based polymer and other resin are preferable.

Use of the retardation developing agent of the invention is more preferable from the viewpoints of efficiently developing Re and realizing an adequate Nz factor. Among the foregoing retardation developing agents, examples of the developing agent include the disc-shaped compound and the rod-shaped compound.

(Retardation Reducing Agent)

In the invention, as one of means of retardation control, there can be widely adopted, as a retardation reducing agent, ester based compounds that are a phosphoric acid based compound and, as an additive of the cellulose acylate film, known compounds.

As the polymer based retardation reducing agent, polyester based polymers that are an phosphoric acid based compound, styrene based polymers, acrylic polymers, and copolymers thereof are chosen, with acrylic polymers and styrene based polymers being preferable. Also, it is preferable that at least one polymer having a negative inherent birefringence, such as styrene based polymers and acrylic polymers, is contained.

As the low-molecular weight retardation reducing agent, the following can be exemplified. These may be either a solid or an oily material. That is, the low-molecular weight retardation reducing agent is not particularly limited with respect to its melting point or boiling point. For example, there are exemplified a mixture of an ultraviolet ray absorber of not higher than 20° C. and an ultraviolet ray absorber of 20° C. or higher; and similarly, a mixture of deterioration inhibitors. Moreover, infrared absorbing dyes are described in, for example, JP-A-2001-194522. Also, with respect to an addition timing thereof, though the retardation reducing agent may be added at any time in a cellulose acylate solution (dope) fabrication step, a step of preparation by adding additives in the final preparation step of the dope preparation step may be added. Moreover, an addition amount of each of the raw materials is not particularly limited so far as the functions are revealed.

Though the low-molecular weight retardation reducing agent is not particularly limited, details thereof are described in paragraphs [0066] to [0085] of JP-A-2007-272177.

A compound described as the general formula (1) in paragraphs [0066] to [0085] of JP-A-2007-272177 can be prepared by the following method.

The compound of the general formula (1) of JP-A-2007-272177 can be obtained by a condensation reaction between a sulfonyl chloride derivative and an amine derivative.

A compound described in the general formula (2) of JP-A-2007-272177 can be obtained by a dehydration condensation reaction between a carboxylic acid and an amine by using a condensing agent (for example, dicyclohexylcarbodiimide (DCC), etc.), or a substitution reaction between a carboxylic acid chloride derivative and an amine derivative, or the like.

(Deterioration Inhibitor)

In the invention, to the cellulose acylate solution, a known deterioration (oxidation) inhibitor, for example, phenol based or hydroquinone based antioxidants, such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, and pentaerythrityl-tetrakis[3-(3,5-di-tert-butyl-4-hydroxyphenyl)propionate], can be added. Furthermore, it is preferable to add a phosphorus based antioxidant such as tris(4-methoxy-3,5-diphenyl)phosphite, tris(nonylphenyl)phosphite, tris(2,4-di-tert-butylphenyl)phosphite, bis(2,6-di-tert-butyl-4-methylphenyl)pentaerythritol diphosphite, and bis(2,4-di-tert-butylphenyl)pentaerythritol diphosphite. An addition amount of the deterioration inhibitor is from 0.05 to 5.0 parts by mass based on 100 parts by mass of the cellulose based resin.

(Ultraviolet Ray Absorber)

In the invention, from the viewpoint of preventing the deterioration of a polarizing plate or a liquid crystal or the like, an ultraviolet ray absorber is preferably used for the cellulose acylate solution. As the ultraviolet ray absorber, ones not only having excellent absorbing ability of ultraviolet rays having a wavelength of not more than 370 nm but having low absorption of visible light having a wavelength of 400 nm or more from the viewpoint of favorable liquid crystal display properties are preferably used. Specific examples of the ultraviolet ray absorber which is preferably used in the invention include hindered phenol based compounds, hydroxybenzophenone based compounds, benzotriazole based compounds, salicylic ester based compounds, benzophenone based compounds, cyanoacrylate based compounds, and nickel complex salt based compounds. Examples of the hindered phenol based compound include 2,6-di-tert-butyl-p-cresol, pentaerythrityl-tetrakis[3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, and tris-(3,5-di-tert-butyl-4-hydroxybenzyl)-isocyanurate. Examples of the benzotriazole based compound include 2-(2'-hydroxy-5'-methylphenyl)benzotriazole, 2,2-methylenebis(4-(1,1,3,3-tetramethylutyl)-6-(2H-benzotriazol-2-yl)phenol), (2,4-bis-(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2(2'-hydroxy-3',5'-di-tert-butylphenyl)-5-chlorobenzotriazole, 2(2'-hydroxy-3',5'-di-tert-amylphenyl)-5-chlorobenzotriazole, 2,6-di-tert-butyl-p-cresol, and pentaerythrityl-tetrakis[3-(3,5-di-tert-butyl-4-hydroxyphenyl)propionate]. An addition amount of such an ultraviolet ray absorber is preferably from 1 ppm to 1.0%, and more preferably from to 1,000 ppm in terms of a mass proportion in the whole of the cellulose acylate film.

(Matting Agent)

From the viewpoints of film slipperiness and stable manufacture, it is preferable that the film of the invention contains a matting agent. The matting agent may be a matting agent of an inorganic compound, or may be a matting agent of an organic compound.

Preferred specific examples of the matting agent of an inorganic compound include a silicone-containing inorganic compound (for example, silicone dioxide, calcined calcium silicate, hydrated calcium silicate, aluminum silicate, magnesium silicate, etc.), titanium oxide, zinc oxide, aluminum oxide, barium oxide, zirconium oxide, strontium oxide, antimony oxide, tin oxide, antimony tin oxide, calcium carbonate, talc, clay, calcined kaolin, and potassium phosphate. Of these, a silicon-containing inorganic compound and zirconium oxide are more preferable, and in view of the fact that the turbidity of the cellulose acylate film can be reduced, silicon dioxide is especially preferably used. As the fine particle of silicon dioxide, there can be used commercially available products such as AEROSIL R972, R974, R812, 200, 300, R202, OX50, and TT600 (all of which are manufactured by Nippon Aerosil Co., Ltd.). The fine particle of zirconium oxide is commercially available under trade names of AEROSIL R976 and R811 (both of which are manufactured by Nippon Aerosil Co., Ltd.), and these commercially available products are usable.

Preferred specific examples of the matting agent of an organic compound include polymers such as silicone resins, fluorocarbon resins, and acrylic resins, with silicone resins being especially preferable. Among the silicone resins, those having a three-dimensional network structure are preferable, and commercially available products having a trade name including TOSPEARL 103, TOSPEARL 105, TOSPEARL 108, TOSPEARL 120, TOSPEARL 145, TOSPEARL 3120, and TOSPEARL 240 (all of which are manufactured by GE Toshiba Silicone Co., Ltd.) can be used.

In the case of adding such a matting agent to the cellulose acylate solution, a method thereof is not particularly limited, and any method is applicable without a problem so far as a desired cellulose acylate solution can be obtained. For example, the additive may be added in a stage where a cellulose acylate is mixed with a solvent; or the additive may be added to a mixture solution prepared from a cellulose acylate and a solvent. Further, the additive may be added to and mixed with a dope just before the dope is cast, and this is a so-called preceeding addition method, in which the ingredients may be on-line mixed by screw kneading. Specifically, preferred is a static mixer such as an in-line mixer. Also, as the in-line mixer, for example, preferred is a static mixer, SWJ (Toray's static tubular mixer, Hi-Mixer, manufactured by Toray Engineering Co., Ltd.). Regarding the mode of in-line addition, JP-A 2003-053752 describes an invention of a method for producing a cellulose acylate film wherein, for the purpose of preventing concentration unevenness and particle aggregation, a distance L between a nozzle tip through which an additive liquid having a composition differing from that of the main material dope and a start end of an in-line mixer is controlled to be not more than 5 times an inner diameter d of the main material feeding line, thereby preventing concentration unevenness and aggregation of matting particles, etc. Furthermore, JP-A 2003-053752 discloses a more preferred embodiment, in which a distance (L) between a nozzle tip opening through which an additive liquid having a composition differing from that of the main material dope and a start end of the in-line mixer is controlled to be not more than 10 times an inner diameter (d) of the feeding nozzle tip opening, and the in-line mixer is a static non-stirring tubular mixer or a dynamic stirring tubular mixer. More specifically, JP-A 2003-053752 discloses that a flow rate ratio of the cellulose acylate film main material dope/in-line additive liquid is from 10/1 to 500/1, and more preferably from 50/1 to 200/1. JP-A 2003-014933 discloses an invention of providing a retardation film which is free from a trouble of additive bleedout and a trouble of interlayer release and which has good slipperiness and excellent transparency; and regarding the method of adding additives to the film, JP-A 2003-014933 says that the additive may be added to a dissolving tank, or the additive or a solution or dispersion of the additive may be added to the dope being fed in the process from the dissolving tank to a co-casting die, further describing that in the latter case, mixing means such as a static mixer is preferably provided for the purpose of enhancing the mixing efficiency therein.

(Organic Acid)

It is preferable that the film of the invention contains an organic acid represented by the following general formula (1).

   General formula (1)

In the general formula (1), X represents an acidic group having an acid dissociation constant of not more than 5.5; L represents a single bond or a divalent or polyvalent connecting group; $R^1$ represents an alkyl group having a carbon number of from 6 to 30, an alkenyl group having a carbon number of from 6 to 30, an alkynyl group having a carbon number of from 6 to 30, an aryl group having a carbon number of from 6 to 30, or a heterocyclic group having a carbon number of from 6 to 30, and may further have a substituent; and when L is a single bond, then n is 1, and when L is a divalent or polyvalent connecting group, then n is ((valence of L)−1).

In the organic acid represented by the foregoing general formula (1), releasability from solution film-forming equipment (metal support when the dope is cast) can be improved by the foregoing X moiety that is the acidic group.

Furthermore, in view of the fact that the X moiety that is the acidic group attaches to the metal surface of the support, and the $R^1$ moiety that is a hydrophobic group having a specified structure blocks the metal surface of the support from an oxidizing agent such as oxygen, the organic acid represented by the foregoing general formula (1) is able to prevent corrosion of the metal as compared with an organic acid having a hydrophobic group falling outside of the foregoing range of $R^1$.

A release accelerator which can be used for the film of the invention is hereunder described.

In the general formula (1), X represents an acidic group having an acid dissociation constant of not more than 5.5 and is preferably a carboxyl group, a sulfonic acid group, a sulfinic acid group, a phosphoric acid group, a sulfonimide group, or an ascorbic acid group, more preferably a carboxyl group or a sulfonic acid group, and most preferably a carboxyl group. Incidentally, in the case where X represents an ascorbic acid group, it is preferable that among hydrogen atoms of ascorbic acid, the hydrogen atoms at the 5- and 6-positions leave to connect to L.

In this specification, as the acid dissociation constant, values described in *Chemical Handbook*, published by Maruzen Publishing Co., Ltd. are adopted.

In the general formula (1), $R^1$ represents a hydrogen atom, or an alkyl group (optionally having a substituent), an alkenyl group (optionally having a substituent), an alkynyl group (optionally having a substituent), an aryl group (optionally having a substituent), or a heterocyclic group (optionally having a substituent), each having a carbon number of from 6 to 30. Examples of the substituent include a halogen atom, an aryl group, a heterocyclic group, an alkoxy group, an aryloxy group, an alkylthio group, an arylthio group, an acyl group, a hydroxyl group, an acyloxy group, an amino group, an alkoxycarbonyl group, an acylamino group, an oxycarbonyl group, a carbamoyl group, a sulfonyl group, a sulfamoyl group, a sulfonamide group, a sulfolyl group, and a carboxyl group.

$R^1$ is more preferably an alkyl group, an alkenyl group, or an alkynyl group, each having a carbon number of from 8 to 24, and most preferably a linear alkyl group or a linear alkenyl group, each having a carbon number of from 10 to 24.

In the general formula (1), L is preferably a single bond, or a divalent or polyvalent connecting group obtained from the following unit group or a divalent or polyvalent connecting group obtained from a combination of two or more units selected from the following unit group.

Unit: —O—, —CO—, —N(—$R^2$)— ($R^2$ is an alkyl group having a carbon number of from 1 to 5), —CH═CH—, —CH(OH)—, —CH$_2$—, —SO$_2$—,

In the general formula (1), it is especially preferable that L is a single bond or has, as a partial structure, an ester group-derived connecting group (—COO— or —OCO—) or an amide group-derived connecting group (—CONR$^2$— or —NR$^2$CO—).

Also, L may further have a substituent. Though the substituent is not particularly limited, examples thereof include those which $R^1$ may have. Among them, an —OH group is preferable.

Of these, L is more preferably a connecting group containing a glycerin-derived group.

As L, the following structures are preferable. In the following, each of p, q, and r represents an integer of from 1 to 40, preferably from 1 to 20, more preferably from 1 to 10, and especially preferably from 1 to 6. Also, q is especially preferably from 2 to 4.

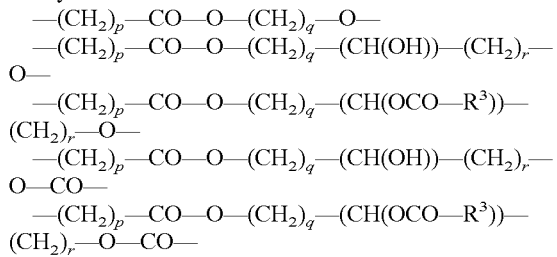

Incidentally, $R^3$ contained in the foregoing specific examples of L is synonymous with $R^1$ in the foregoing general formula (1). That is, $R^3$ in the connecting group of —(CH$_2$)$_p$—CO—O—(CH$_2$)$_q$—(CH(OCO—$R^3$))—(CH$_2$)$_r$—O— is described merely in the inside of L for the sake of convenience, and the connecting group L means a portion from which $R^3$ has been eliminated. Namely, in that case, L is trivalent. When represented by the general formula (1), it can be described as X-L-($R^1$)$_2$ [wherein L represents —(CH$_2$)$_p$—CO—O—(CH$_2$)$_q$(CH$_2$)$_q$—(CH(OCO—))—(CH$_2$)$_r$—O—], namely, at that time, the connecting group L is a trivalent connecting group.

L and X are connected to each other preferably via an ester bond or an amide bond, and more preferably via an ester bond. Also, it is preferable that an ester bond or an amide bond is not present in X.

L and $R^1$ are connected to each other preferably via an ester bond, an ether bond, or an amide bond, more preferably via an ester bond or an amide bond, and especially preferable via an ester bond. Also, it is preferable that an ester bond, an ether bond, or an amide bond is not present in $R^1$.

Preferred specific examples of the organic acid represented by the foregoing general formula (1) are hereunder described.

<Fatty Acid>

Myristic acid, palmitic acid, stearic acid, oleic acid, linoleic acid, linolenic acid, ricinoleic acid, and undecanoic acid <Alkyl Sulfate>

Myristyl sulfate, cetyl sulfate, and oleyl sulfate

<Alkylbenzenesulfonic Acid>

Dodecylbenzenesulfonic acid and pentadecylbenzenesulfonic acid

<Alkylnaphthalenesulfonic Acid>

Sesquibutylnaphthalenesulfonic acid and diisobutylnaphthalenesulfonic acid

<Dialkylsulfosuccinic Acid>

Dioctylsulfosuccinic acid, dihexylsulfosuccinic acid, dicyclohexylsuccinic acid, diamylsulfosuccinic acid, and ditridecylsulfosuccinic acid <Partial Derivative of Polyvalent Organic Acid>

The organic acid represented by the foregoing general formula (1) is preferably a partial derivative of a polyvalent organic acid. The partial derivative of a polyvalent organic acid as referred to in this specification means a compound having a structure in which one molecule of a fatty acid and a polyvalent organic acid are ester-bonded to one molecule of a polyhydric alcohol and having at least one polyvalent carboxylic acid-derived unsubstituted acidic group. Incidentally, the fatty acid as referred to in this specification means an aliphatic monocarboxylic acid. That is, in this specification, the fatty acid is not limited to a so-called higher fatty acid but includes a lower fatty acid having a carbon number of not more than 12, such as acetic acid and propionic acid.

The foregoing partial derivative of a polyvalent organic acid is preferably a partial derivative of a polyvalent carboxylic acid. That is, it is preferable that the organic acid represented by the foregoing general formula (1) has a structure in which one molecule of a fatty acid and one molecule of a polyvalent carboxylic acid are ester-bonded to one molecule of a polyhydric alcohol and having at least one polyvalent carboxylic acid-derived unsubstituted carboxyl group. Though the polyvalent carboxylic acid which is used for the partial derivative of a polyvalent carboxylic acid is not particularly limited, for example, succinic acid, citric acid, tartaric acid, diacetyltartaric acid, malic acid, and adipic acid are preferable.

Examples of the polyhydric alcohol which is used for the partial derivative of a polyvalent organic acid include adonitol, arabitol, ethylene glycol, ethylene glycol, diethylene glycol, triethylene glycol, tetraethylene glycol, 1,2-propanediol, 1,3-propanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, and glycerin. Of these, glycerin is preferable, and the organic acid represented by the foregoing general formula (1) is preferably an organic acid glyceride.

As the organic acid represented by the foregoing general formula (1), an organic acid glyceride in which the acidic group X of the organic acid is bonded to the hydrophobic moiety $R^1$ via the glycerin-derived group-containing connecting group L (glycerin fatty acid organic acid ester) is preferable. Here, the organic acid glyceride as referred to in this specification means a compound having a structure in which one or two of three hydroxyl groups of glycerin form an ester bond with the fatty acid, and the remaining one or two hydroxyl groups form an ester bond with the polyvalent organic acid, and which has the polyvalent organic acid-derived acidic group.

Above all, an organic acid monoglyceride or an organic acid diglyceride is more preferable, and an organic acid monoglyceride is especially preferable. The organic acid monoglyceride as referred to in this specification means a compound having a structure in which one of three hydroxyl groups of glycerin forms an ester bond with the fatty acid, and one or two of the remaining hydroxyl groups form an ester bond with the polyvalent organic acid, and which has the polyvalent organic acid-derived acidic group. The organic acid diglyceride as referred to in this specification means a compound having a structure in which two of three hydroxyl groups of glycerin form an ester bond with the fatty acid, and the remaining one hydroxyl group forms an ester bond with the polyvalent organic acid, and which has the polyvalent organic acid-derived acidic group.

Among the organic acid monoglycerides, a compound having a structure in which one of here hydroxyl groups of glycerin forms an ester bond with the fatty acid, one of the remaining hydroxyl groups is an unsubstituted hydroxyl group, and the remaining one hydroxyl group forms an ester bond with the polyvalent organic acid, and which has the polyvalent organic acid-derived acidic group is especially preferable. It is preferable that the hydroxyl group which is ester-bonded to the fatty acid of the organic acid monoglyceride is located at an asymmetric position (so-called position of α-monoglyceride); and it is similarly preferable that the hydroxyl group which is ester-bonded to the polyvalent organic acid of the organic acid monoglyceride is located at an asymmetric position (so-called position of α-monoglyceride). That is, among the organic acid monoglycerides, a compound having a structure which has an unsubstituted hydroxyl group and in which a carbon atom directly bonded to the hydroxyl group ester-bonded to the fatty acid and a carbon atom directly bonded to the hydroxyl group ester-bonded to the polyvalent organic acid are not adjoined to each other is preferable.

Among the organic acid monoglycerides, a monoglyceride of a polyvalent carboxylic acid is especially preferable. The monoglyceride of a polyvalent carboxylic acid as referred to therein means an organic acid in which at least one of polyvalent carboxylic acids has an unsubstituted carboxyl group, and other carboxyl groups are substituted with a monoglyceride. That is, a carboxyl group-containing organic acid monoglyceride in which one molecule of a fatty acid and one molecule of a polyvalent carboxylic acid are bonded to each other in one molecule of glycerin is especially preferable.

Though the polyvalent carboxylic acid which is used for the monoglyceride of a polyvalent carboxylic acid is not particularly limited, for example, succinic acid, citric acid, tartaric acid, diacetyltartaric acid, malic acid, and adipic acid are preferable.

Though the fatty acid which is used for the monoglyceride of a polyvalent carboxylic acid is not particularly limited, a saturated or unsaturated fatty acid having a carbon number of from 8 to 22 is preferable. Specific examples thereof include caprylic acid, capric acid, lauric acid, myristic acid, palmitic acid, stearic acid, behenic acid, and oleic acid.

The carboxyl group-containing organic acid monoglyceride which can be used in the invention is hereunder described in detail.

The carboxyl group-containing organic acid monoglyceride which can be used in the invention is in general obtained by allowing an anhydride of a polyvalent organic acid and a fatty acid monoglyceride to react with each other according to a method described in JP-A-4-218597, Japanese Patent No. 3823524, etc.

The reaction is usually carried out under a non-solvent condition. For example, in a reaction between succinic anhydride and a fatty acid monoglyceride having a carbon number of 18, the reaction is accomplished at a temperature of about 120° C. for about 90 minutes. The thus obtained organic acid monoglyceride is usually a mixture containing an organic acid, an unreacted monoglyceride, a diglyceride, and other oligomer. In the invention, such a mixture may be used as it is.

In the case where it is intended to increase a purity of the carboxyl group-containing organic acid monoglyceride, the carboxyl group-containing organic acid monoglyceride in the foregoing mixture may be purified by means of distillation or the like. Also, as the carboxyl group-containing organic monoglyceride having a high purity, one which is commercially available as a distilled monoglyceride can be used. Examples of a commercially available product of the carboxyl group-containing organic monoglyceride include POEM K-37V, manufactured by Riken Vitamin Co., Ltd. (glycerin citric acid oleic acid ester) and STEP SS, manufactured by Kao Corporation (glycerin stearic acid/palmitic acid succinic acid ester).

An addition amount of the organic acid represented by the foregoing general formula (1), which is contained in the film of the invention, is from 0.1% by mass to 20% by mass, preferably from 0.5% by mass to 10% by mass, more preferably from 0.6% by mass to 5% by mass, and especially preferably from 1.5% by mass to 5% by mass.

When the addition amount of the organic acid is 0.1% by mass or more, an improving effect of durability of a polarizer and an improving effect of releasability are sufficient. Also, when the addition amount of the organic acid is not more than 20% by mass, the organic acid hardly causes bleedout with a lapse of time at high temperature and high humidity, and an orthogonal transmittance of a polarizing plate hardly increases, and therefore, such is preferable.

A molecular weight of the organic acid represented by the foregoing general formula (1) is preferably from 200 to 1,000.

[Manufacturing Method of Film]

The film of the invention can be efficiently manufactured by adopting a film formation condition while making the case of using cellulose acetate as the cellulose acylate and the case of using cellulose butyrate or cellulose propionate as the cellulose acylate different from each other, according to a manufacturing method of the film of the invention (hereinafter also referred to as "manufacturing method of the invention") as described in detail.

In the case of using cellulose acetate as the cellulose acylate, the manufacturing method of the invention includes a step of subjecting a dope containing cellulose acetate having a total acyl substitution degree of from 2.10 to 2.95 to solution casting on a metal support to obtain a film; a step of stripping the film from the metal support in a residual volatile matter H1 satisfying the following expression (i); a step of stretching the stripped film in a state of a residual volatile matter H2 satisfying the following expression (ii) in a ratio of from 1 to 100% in a film conveying direction; and a step of stretching the stripped film in a state of a residual volatile matter H3 satisfying the following expression (iii) in a ratio of from 3 to 150% in a direction orthogonal to the film conveying direction, with the stretching step being satisfied with the following expression (iv).

$20\% \leq H1 \leq 60\%$        Expression (i)

$10\% \leq H2 \leq 60\%$        Expression (ii)

$5\% \leq H3 \leq 45\%$        Expression (iii)

$TD$ stretching ratio $\geq 3\%$        Expression (iv)

In the foregoing expression (iv), the TD stretching ratio represents a stretching ratio (unit: %) in a direction orthogonal to the film conveying direction.

In the case of using cellulose butyrate or cellulose propionate as the cellulose acylate, the manufacturing method of the invention includes a step of subjecting a dope containing cellulose butyrate or cellulose propionate having a total acyl substitution degree of from 2.10 to 2.95 to solution casting on a metal support to obtain a film; a step of stripping the film from the metal support in a residual volatile matter H1 satisfying the following expression (i); a step of stretching the stripped film in a state of a residual volatile matter H2 satisfying the following expression (ii) in a ratio of from 1 to 100% in a film conveying direction; and a step of stretching the stripped film in a state of a residual volatile matter H3 satisfying the following expression (iii) in a ratio of from 3 to 150% in a direction orthogonal to the film conveying direction, with the stretching step being satisfied with the following expression (iv).

$20\% \leq H1 \leq 60\%$        Expression (i)

$10\% \leq H2 \leq 60\%$        Expression (ii)

$5\% \leq H3 \leq 45\%$        Expression (iii)

$TD$ stretching ratio $\geq 3\%$        Expression (iv)

The manufacturing method of the invention is hereunder described.

<Step of Forming a Cellulose Acylate in a Film Form>

In the manufacture method of the invention, in the step of forming a cellulose acylate in a film form, a solution casting film formation method may be used, or a melt film formation method may also be used. Of these, a solution casting film formation method is preferably adopted, and a method of casting a dope containing a cellulose acylate and a solvent on a support is more preferably adopted. Also, in the manufacturing method of the invention, it is especially preferable that the dope is cast on the support, and the solvent is evaporated to form a cellulose acylate film.

(Manufacture of Dope)

In the manufacturing method of the invention, the respective components which are preferable to be contained in the dope are described. However, it is preferable that the retardation developing agent is not contained in an amount exceeding 3% by mass relative to the cellulose butyrate or cellulose propionate. Other additives can be preferably used within the ranges exemplified above in the explanation of the film of the invention, and a timing of addition thereof to the dope is not particularly limited.

In the dope which is used in the invention, it is preferable to adjust the amount of the cellulose acylate such that from 10 to 40% by mass of the cellulose acylate is contained in the obtained dope. The amount of the cellulose acylate is more preferably from 10 to 30% by mass.

As the solvent which is used in the dope in the manufacturing method of the invention, a known solvent can be adopted so far as it is a solvent used for solution casting. From the viewpoint of more lowering a haze, it is preferable that a solvent selected from an ether having a carbon atom number of from 3 to 12, a ketone having a carbon atom number of from 3 to 12, an ester having a carbon atom number of from 3 to 12, and a halogenated hydrocarbon having a carbon atom number of from 1 to 6 is contained. Each of the ether, the ketone, and the ester may have a cyclic structure. A compound having two or more of any functional groups of an ether, a ketone, and an ester (namely, —O—, —CO—, and —COO—) can also be used as the solvent. The solvent may also have other functional group such as an alcoholic hydroxyl group. In the case of a solvent having two or more kinds of functional groups, its carbon atom number may fall within a specified range of the compound having any functional group.

Examples of the ether having a carbon atom number of from 3 to 12 include diisopropyl ether, dimethoxymethane, dimethoxyethane, 1,4-dioxane, 1,3-dioxolane, tetrahydrofuran, anisole, and phenetole.

Examples of the ketone having a carbon atom number of from 3 to 12 include acetone, methyl ethyl ketone, diethyl ketone, diisobutyl ketone, cyclohexanone, and methyl cyclohexanone.

Examples of the ester having a carbon atom number of from 3 to 12 include ethyl formate, propyl formate, pentyl formate, methyl acetate, ethyl acetate, and pentyl acetate.

Examples of the organic solvent having two or more kinds of functional groups include 2-ethoxyethyl acetate, 2-methoxyethanol, and 2-butoxyethanol.

The carbon atom number of the halogenated hydrocarbon is preferably 1 or 2, and most preferably 1. The halogen of the halogenated hydrocarbon is preferably chlorine. A proportion at which the hydrogen atoms of the halogenated hydrocarbon are substituted with a halogen is preferably from 25 to 75 mol %, more preferably from 30 to 70 mol %, still more preferably from to 65 mol %, and most preferably from 40 to 60 mol %. Examples of the halogenated hydrocarbon include dichloromethane, chloroform, methyl chloride, carbon tetrachloride, trichloroacetic acid, methyl bromide, methyl iodide, and tri- or tetrachloroethylene. It is preferable that at least dichloromethane is contained.

In the invention, it is desirable that a poor solvent is further contained preferably in a proportion of from 3 to 30% by weight, and more preferably in a proportion of from 5 to 20% by weight. When the poor solvent is contained within the foregoing range, the compatibility with the cellulose acylate is enhanced, and the haze tends to be more lowered, and therefore, such is preferable.

Furthermore, a boiling point of the poor solvent is preferably not higher than 120° C., and more preferably from 40 to 100° C. When the boiling point of the poor solvent is not more than 120° C., a drying rate of the solvent can be made faster, and therefore, such is preferable.

Preferred examples of such a poor solvent include methanol, ethanol, propanol, butanol, and water, with methanol being more preferable.

The foregoing dope can be prepared by a general method. The general method as referred to herein means a treatment at a temperature of 0° C. or higher (ordinary temperature or high temperature). The preparation of a solution can be carried out using preparation method and apparatus of a dope in a usual solvent casting method. The dope can be prepared by stirring the cellulose acylate and the solvent at ordinary temperature (from 0 to 40° C.). A high-concentration solution may be stirred under pressurization and heating conditions. Specifically, the cellulose acetate and the solvent are put in a pressure vessel and hermetically sealed, and the mixture is stirred under a pressure while heating at a temperature of a boiling point of the solvent at ordinary temperature or higher and falling within the range where the solvent does not boil. The heating temperature is usually 40° C. or higher, preferably from 60 to 200° C., and more preferably from 80 to 110° C.

The respective components may be coarsely mixed and then put in the vessel (e.g., a tank, etc.). Also, the components may be successively charged in the vessel. It is necessary that the vessel is configured such that stirring can be achieved. The vessel can be pressurized by pouring an inert gas such as a nitrogen gas. Also, an increase of the vapor pressure of the solvent due to heating may be utilized. Alternatively, after hermetically sealing the vessel, the respective components may be added under a pressure.

In the case of performing heating, it is preferable that heating is performed from the outside of the vessel. For example, a jacket type heating apparatus can be used. Also, the whole of the vessel can be heated by providing a plate heater on the outside of the vessel, laying a pipe and circulating a liquid thereinto.

It is preferred to provide a stirring blade in the inside of the vessel and performing stirring using this. The stirring blade is preferably one having a length so as to reach the vicinity of a wall of the vessel. It is preferable that a scraping blade is provided at the end of the stirring blade for the purpose of renewing a liquid film of the wall of the vessel.

Measuring instruments such as a pressure gauge and a thermometer may be provided in the vessel. In the vessel, the respective components are dissolved in a solvent. The prepared dope is cooled and then taken out from the vessel, or taken out from the vessel and then cooled by using a heat exchanger or the like.

The dope can also be prepared by a cooling dissolution method.

(Film Formation Step)

In the invention, it is preferable to manufacture a cellulose acylate film from the prepared dope by a solvent casting method.

As a method and equipment for manufacturing the film of the invention, a solution casting film formation method and a solution casting film formation apparatus which have been conventionally provided for the manufacture of a cellulose triacetate film are adopted. A dope (cellulose acylate solution) prepared in a dissolution machine (pot) is once stored in a storage pot, and after defoaming of bubbles contained in the dope, the dope is subjected to final preparation. A pressure die in which a slit shape of a nozzle portion of a die is adjustable, and a film thickness is easily made uniform is preferable. The pressure die includes a coat hunger type and a T-die type, and all of these types can be preferably used. A surface of a metal support is mirror-finished. For the purpose of increasing a film formation rate, two or more pressure dies may be provided on the metal support, thereby dividing the dope amount and superimposing the dope. Alternatively, it is also preferable to obtain a film having a laminated structure by a co-casting method of simultaneously casting plural dopes.

The dope is discharged from a dope exhaust and fed into a pressure die via, for example, a pressure constant-rate gear pump capable of feeding the dope at a constant flow rate at a high accuracy depending upon a rotational rate; the dope is uniformly cast from a nozzle (slit) of the pressure die onto a metal support continuously running in an endless manner in the casting section; and at a release point where the metal support has substantially made a round, the half-dried dope film (also called a web) is released from the metal support. The obtained web is clipped at both ends and dried by conveying with a tenter. Subsequently, the resulting film is conveyed with a group of rolls in a dryer to terminate the drying and then wound up with a winder in a prescribed length. A combination of the tenter and the dryer of a group of rolls varies depending upon the purpose. In the solution casting film formation method to be used for a functional protective film for electronic display, in addition to a solution casting film forming apparatus, a coating apparatus is frequently added for the surface processing onto a film such as a subbing layer, an antistatic layer, an anti-halation layer, and a protective layer. The respective manufacturing steps are hereunder briefly described, but it should not be construed that the invention is limited thereto.

It is preferable to form the film by casting the prepared dope on an endless metal support, for example, a metal drum or a metal support (band or belt) and evaporating the solvent. It is preferable to adjust a concentration of the dope before casting such that the cellulose amount is from 10 to 35% by mass. It is preferable that the surface of the drum or band is finished in a mirror surface state. The casting drying method in the solvent casting process is described in each of U.S. Pat. Nos. 2,336,310, 2,367,603, 2,492,078, 2,492,977, 2,492,978, 2,607,704, 2,739,069 and 2,739,070, U.K. Patents Nos. 640, 731 and 736,892, JP-B-45-4554, JP-B-49-5614, JP-A-60-176834, JP-A-60-203430, and JP-A-62-115035.

Furthermore, a cellulose acylate film formation technology described in each of JP-A-2000-301555, JP-A-2000-301558, JP-A-7-032391, JP-A-3-193316, JP-A-5-086212, JP-A-62-037113, JP-A-2-276607, JP-A-55-014201, JP-A-2-111511, and JP-A-2-208650 can be applied in the invention.

It is preferable that the dope is cast on a drum or a band having a surface temperature of not higher than 30° C. In particular, it is preferable that a metal support temperature is from −50 to 20° C. In the manufacturing method of the invention, it is preferable to blow a dry wind against the dope having been cast on the metal support, from both of the rear surface and front surface of the metal support. It is preferable that after casting, a wind is blown for 2 seconds or more to achieve drying. The resulting film is stripped from the drum or band and further dried by a high-temperature wind while successively changing the temperature from 100° C. to 160° C., whereby the residual solvent can be evaporated. The foregoing method is described in JP-B-5-17844. According to this method, it is possible to shorten a time of from casting to stripping. In order to carry out this method, it is necessary that the dope is gelled at the surface temperature of the drum or band at the time of casting.

In the manufacturing method of the invention, it is preferable to use two or more kinds of dopes having a different total acyl substitution degree of the cellulose acylate from each other and co-casting the respective dopes on the support.

In forming the film of the invention, it is preferable to adopt a lamination casting method such as a co-casting method, a sequential casting method, and a coating method. In particular, it is especially preferable to adopt a simultaneous co-casting method from the viewpoints of stable manufacture and a reduction of production costs.

In the case of manufacturing the film by a co-casting method or a sequential casting method, first of all, cellulose acetate solutions (dopes) for respective layers are prepared. The co-casting method (multilayer simultaneous casting) is a casting method in which the casting dopes for the respective layers (which may be three layers or more layers) are extruded on a casting support (a band or a drum) from a casting Gieser for simultaneously extruding the dopes from separate slits or the like, thereby simultaneously casting the respective layers, and the resulting film is stripped from the support at an appropriate timing and then dried to mold a film.

The sequential casting method is a casting method in which a casting dope for a first layer is first extruded and cast on a casting support from a casting Gieser; and a casting dope for a second layer is extruded and cast thereon after drying or without drying; and if desired, a dope or dopes for a third layer or more layers are sequentially cast and laminated; and the resulting film is stripped from the support at an appropriate timing and then dried to mold a film. The coating method is in general a method in which a film of a core layer is molded into a film by a solution film formation method; a coating solution to be coated on a surface layer is prepared; and the coating solution is coated sequentially on every surface or simultaneously on the both surfaces by using an appropriate coating machine, followed by drying to mold a film having a laminated structure.

(Stripping)

The stripping is a step of releasing the web from which the solvent has been evaporated on the metal support, at a release position. The released web is sent to a subsequent step. Incidentally, when the residual volatile matter (see the following expression) at a point of time of releasing is excessively large, the release is hardly achieved, and reversely, when the release is performed after sufficiently and excessively drying the web on the metal support, a part of the web likely comes off on the way.

Here, as a method of increasing the film formation rate (the film formation rate can be increased by performing releasing within a range where the residual solvent amount is large as far as possible), there is exemplified a gel casting method. Examples thereof include a method in which a poor solvent against the cellulose acylate is added to the dope, and the resulting dope is cast and then gelled; and a method in which the temperature of the metal support is decreased to achieve gelation. When the dope is gelled on the metal support to increase the strength of the film at the time of releasing, the release is made fast, thereby enabling the film formation rate to be increased.

With respect to the residual solvent amount at the time of releasing the web on the metal support, it is preferable to perform releasing within the range of from 5 to 150% by mass depending upon strength and weakness of the drying condition, the length of the metal support, and the like. However, in the case of performing releasing at a point of time when the residual solvent amount is larger, the residual solvent amount is determined while taking into account a balance between the economical speed and the material quality. In the invention, a temperature at the release position on the metal support is preferably from −50 to 40° C., more preferably from 10 to 40° C., and most preferably from 15 to 30° C.

The manufacturing method of the invention includes a step of stripping the film from the metal support in a residual volatile matter H1 satisfying the following expression (i) regardless of the kind of the cellulose acylate.

$$20\% \leq H1 \leq 60\% \quad \text{Expression (i)}$$

The H1 is preferably from 22 to 55%, and especially preferably from 25 to 45%.

The residual solvent amount can be expressed by the following expression.

$$\text{Residual solvent amount(\% by mass)} = \{(M-N)/N\} \times 100$$

Here, M represents a mass of the web at an arbitrary point of time; and N represents a mass when the web having a mass of M is dried at 110° C. for 3 hours.

A drying method of the web which has been dried on the drum or belt and released is described. It is preferable that the web which has been released at the release position just before the drum or belt makes a round is conveyed by a method of conveying it by allowing it to pass alternately a group of rolls disposed in a zigzag state; a method of holding both ends of the released web by clips or the like and conveying it in a non-contact manner; or the like.

In the manufacturing method of the invention, in a latching portion of from the stripping step to the stretching step, the film passes through preferably three or more pass rolls, more preferably five or more pass rolls, and especially preferably from 7 to 51 pass rolls each having a wrap angle of at least 600 or more. Also, in the manufacturing method of the invention, as described above, it is preferable that at least one dancer roll is included as the pass roll having a wrap angle of 60° or more, and it is preferable that one dancer roll is included.

Incidentally, the wrap angle as referred to in this specification means a size of a central angle connecting a circular arc region where the film wraps the roll to the roll center, and for example, in the case where the film passes through the rolls disposed in a complete zigzag state, the wrap angle is 180 degrees.

Drying is performed by a method of exposing a wind at a prescribed temperature to the both surfaces of the web (film) during conveyance, or a method of adopting heating means such as microwaves. In the case of rapid drying, there is a concern that planarity of the formed film is impaired. Therefore, it is preferable that at an initial stage of drying, the film is dried at a temperature such that the solvent does not foam, and after the drying is advanced, the film is dried at a high temperature. In the drying step after releasing the film from the support, the film tends to contract in a longitudinal direction or width direction due to evaporation of the solvent.

The higher the drying temperature, the larger the contraction is. What the film is dried while suppressing this contraction as far as possible is preferable from the standpoint of making the planarity of the finished film favorable. From this standpoint, a method for performing the drying step entirely or partly while holding both width ends of the web by clips or pins in a width direction (tenter mode) as described in, for example, JP-A-62-46625 is preferable. The drying temperature in the foregoing drying step is preferably from 100 to 145° C. Though the drying temperature, the amount of dry wind, and the drying time vary with the solvent to be used, they may be properly chosen depending upon the kind of the solvent to be used or a combination thereof.

In the manufacturing method of the invention, from the viewpoint of reducing a standard deviation of the slow axis azimuth of the film longitudinal direction, it is preferable that stretching in a direction orthogonal to the film conveying direction is performed by a tenter, and the following expression (v) is satisfied.

$$W \times 30 \geq L \geq W \times 2 \qquad \text{Expression (v)}$$

In the expression (v), L represents a distance (unit: mm) of from the stripping step to the tenter; and W represents a width (unit: mm) of the stripped film.

In the manufacturing method of the invention, it is more preferable to satisfy a relation of ($W \times 28 \geq L \geq W \times 2.5$); and it is especially preferable to satisfy a relation of ($W \times 25 \geq L \geq W \times 3$).

(Stretching Step)

In the manufacture of the film of the invention, a step of stretching the web (film) having been released from the support is included. A preferred range is different between (1) the case of using cellulose acetate as the cellulose acylate and (2) the case of using cellulose butyrate or cellulose propionate as the cellulose acylate, and therefore, the respective cases are hereunder described in success.

The manufacturing method of the invention includes a step of stretching the stripped film in a state of a residual volatile matter H2 satisfying the following expression (ii) in a ratio of from 5 to 100% in a film conveying direction; and a step of stretching the stripped film in a state of a residual volatile matter H3 satisfying the following expression (iii) in a ratio of from 20 to 150% in a direction orthogonal to the film conveying direction, with the stretching step being satisfied with the following expression (iv).

$$10\% \leq H2 \leq 60\% \qquad \text{Expression (ii)}$$

$$5\% \leq H3 \leq 45\% \qquad \text{Expression (iii)}$$

$$TD \text{ stretching ratio} \geq 3\% \qquad \text{Expression (iv)}$$

In the foregoing expression (iv), the TD stretching ratio presents a stretching ratio (unit: %) in a direction orthogonal to the film conveying direction.

In the case of using cellulose acetate as the cell acylate, the stretch ratio in stretching in the film conveying direction is preferably from 1 to 25%, and more preferably from 1 to 10%.

Incidentally, the "stretch ratio (%)" as referred to herein means one determined according to the following expression.

$$\text{Stretch ratio}(\%) = 100 \times \{(\text{Length after stretching}) - (\text{Length before stretching})\}/(\text{Length before stretching})$$

The method of stretching the web in the film conveying direction is not particularly limited. Examples thereof include a method in which plural rolls are provided with a peripheral speed difference, and the web is stretched in a vertical direction by utilizing the roll peripheral speed difference therebetween; a method in which both ends of the web are fixed by clips or pins, and the web is stretched in a vertical direction while widening a gap between the clips or pins in the advancing direction; and a method in which the web is widened simultaneously lengthwise and breadthwise and stretched in vertical and horizontal directions. As a matter of course, a combination of these methods may be adopted. Also, in the case of a so-called tenter method, when a clip portion is driven in a linear drive mode, smooth stretching can be achieved, and risks such as breakage can be reduced. Therefore, this case is preferable. With respect to stretching in the vertical direction, it is preferable to stretch the cellulose acylate film in the conveying direction (vertical direction) by using an apparatus having two nip rolls and making a rotational speed of the nip roll on the outlet side faster than a rotational speed of the nip roll on the inlet side. By performing such stretching, developability of the retardation can also be adjusted.

Also, at that time, the H2 is preferably from 20 to 55%, and more preferably from 25 to 50%.

When the residual volatile matter in the web is too large, a stretching effect is not obtainable, whereas when it is too small, stretching is conspicuously difficult, so that there may be the case where breakage of the web is caused.

In the manufacturing method of the invention, with respect to stretching in the film conveying direction, stretching is performed while controlling a tension fluctuation value to preferably less than 10 N/m, more preferably less than 8 N/m, and especially preferably from 0 N/m to 6 N/m.

In the case of using cellulose acetate as the cellulose acylate, the stretch ratio in a direction orthogonal to the film conveying direction is preferably from 1 to 60%, and more preferably from 1 to 10%.

The method of stretching the web in the direction orthogonal to the film conveying direction is not particularly limited. Examples thereof include a method in which both ends of the web are fixed by clips or pins, and the web is stretched in a horizontal direction while widening a gap between the clips or pins in the horizontal direction; and a method in which the web is widened simultaneously lengthwise and breadthwise and stretched in vertical and horizontal directions. As a matter of course, a combination of these methods may be adopted. Also, in the case of a so-called tenter method, when a clip portion is driven in a linear drive mode, smooth stretching can be achieved, and risks such as breakage can be reduced. Therefore, this case is preferable. In the invention, as the method of stretching the web in the direction orthogonal to the film conveying direction, it is preferable to perform stretching using a tenter apparatus.

Also, at that time, the H3 is preferably from 8 to 40%, and more preferably from 10 to 35%.

When the residual volatile matter in the web is too large, a stretching effect is not obtainable, whereas when it is too small, stretching is conspicuously difficult, so that there may be the case where breakage of the web is caused.

Also, in the case of performing stretching in the film width direction, there may be the case where distribution in refractive index is generated in the width direction. Though this is sometimes observed in the case of, for example, adopting a tenter method, it is a phenomenon in which when stretching is performed in the width direction, a contractile force is generated in the film center, and ends of the film are fixed. It may be considered that this phenomenon is one called a so-called bowing phenomenon. Even in that case, by performing stretching in a casting direction, the bowing phenomenon can be suppressed, and an improvement can be achieved such that distribution in retardation in the width direction is made small. Furthermore, a film thickness fluctuation of the film obtained by performing stretching in two axis directions orthogonal to each other can be reduced. When the film thickness fluctuation of the cellulose acylate film is too large, unevenness of the retardation is caused. The film thickness fluctuation of the cellulose acylate film is controlled within a range of preferably ±3%, and more preferably ±1%. Even for the above-described purpose, a method of performing stretching in two axis directions orthogonal to each other so as to satisfy the expression (iv) is effective.

In the manufacturing method of the invention, a stretching temperature is preferably not higher than (Te+30° C.).

Stretching temperature≤Te+30° C.　　　　　　　(I)

Te=T[tan δ]−ΔTm　　　　　　　(II)

ΔTm=Tm(0)−Tm(x)　　　　　　　(III)

In the expression (II), T[tan δ] represents a temperature at which when a dynamic viscoelasticity tan δ of the cellulose acylate is measured at a residual solvent amount of 0%, tan δ exhibits a peak; Tm(0) represents a crystal melting temperature of the cellulose acylate at residual solvent amount of 0%; and Tm(x) represents a crystal melting temperature of the cellulose acylate at residual solvent amount of x %. Stretching in such a temperature range is also hereunder called low-temperature stretching. By subjecting the film formed in a film form to low-temperature stretching, the Rth developability can be increased without thickening the film thickness of the film of the invention, namely Rth (590)/d can be more increased, and hence, such is preferable. Though this is not tied to any theory, in the low-temperature stretching, orientation of a polymer or additives hardly occurs during stretching as compared with that at a time of high-temperature stretching, and therefore, Re can be developed without lowering Rth. The stretching temperature is more preferably from (Te−30) to Te ° C. The preferred range is the same in both of the case of performing stretching in the film conveying direction and the case of performing stretching in the film width direction.

(Heat Treatment Step)

In the manufacturing method of the film of the invention, the heat treatment step may be provided after completion of the drying step. It is sufficient to perform the heat treatment in the heat treatment step after completion of the drying step, and the heat treatment may be performed immediately after the stretching/drying steps. Alternatively, after completion of the drying step, the film is once wound by a method as described later, and then, only a heat treatment step may be separately provided.

The heat treatment is performed by a method of exposing a wind at a prescribed temperature to the film during conveyance, or a method of adopting heating means such as microwaves.

The heat treatment is performed at a temperature of preferably from 150 to 200° C., and more preferably from 160 to 180° C. Also, the heat treatment is performed for preferably from 1 to 20 minutes, and more preferably from 5 to 10 minutes.

(Winding)

For a winder for winding the obtained film, a generally used winder can be used, and the film can be wound by a winding method such as a constant-tension method, a constant-torque method, a taper tension method, and a programmed tension control method in which an internal stress is constant. In the thus obtained cellulose acylate film roll, the slow axis direction of the film falls preferably within the range of ±2 degrees, and more preferably within the range of ±1 degree relative to the winding direction (longitudinal direction of the film). Alternatively, the slow axis direction of the film falls preferably within the range of ±2 degrees, and more preferably within the range of ±1 degree relative to a rectangular direction (width direction of the film) to the winding direction. In particular, the slow axis direction of the film falls preferably within the range of ±0.1 degrees relative to the winding direction (longitudinal direction of the film). Alternatively, the slow axis direction of the film falls preferably within the range of ±0.1 degrees relative to the width direction of the film.

(Residual Volatile Matter)

From the standpoint of obtaining a film having favorable dimensional stability, the cellulose acylate film thus obtained by the manufacturing method of the film of the invention has a residual volatile matter of the finally finished film of preferably not more than 1% by mass, and more preferably not more than 0.2% by mass.

Incidentally, in the manufacturing method of the invention, a step of manufacturing a film while detecting the slow axis azimuth of the film longitudinal direction in an in-line manner may be included. In that case, a preferred embodiment is the same as the embodiment as described above as the method of determining a standard deviation of the slow axis azimuth of the film longitudinal direction of the film of the invention in an in-line manner.

<Polarizing Plate>

The polarizing plate of the invention comprises a polarizer and the cellulose acylate film of the invention.

The film of the invention has favorable film optical characteristics and also has a film elastic modulus, and therefore, it is preferably used for a protective film for polarizing plate. Also, the film of the invention has favorable surface properties and is small in unevenness upon observation of the film surface properties under a polarizing plate cross Nicol, and therefore, it is suitable for a protective film for polarizing plate. The polarizing plate is formed by sticking and laminating a protective film on at least one surface of a polarizer. As the polarizer, those which have hitherto been known are useful. For example, the polarizer is one obtained by treating a hydrophilic polymer film such as a polyvinyl alcohol film with a dichroic dye such as iodine and stretching the film. Though sticking of the cellulose acylate film and the polarizer is not particularly limited, it can be performed with an adhesive made of an aqueous solution of a water-soluble polymer. As this water-soluble polymer adhesive, a polyvinyl alcohol aqueous solution of a complete saponification type is preferably useful.

Also, the polarizing plate using the film of the invention is small in scattering of the slow axis distribution and is able to provide a liquid crystal display device having a favorable display performance. Furthermore, in the case of an embodiment where the film of the invention is preferable to be wide in the width, at the time of manufacturing a polarizing plate by sticking the film of the invention to a polarizer, it is possible to perform so-called double taking or triple taking, whereby the manufacturing costs of polarizing plate can be reduced. Also, in the case of an embodiment where σ600 or σ-600 in the film width direction is good, the performance of the polarizing plate having been subjected to double taking or triple taking can be further improved.

<Liquid Crystal Display Device>

The liquid crystal display device comprises a cellulose acylate film or the polarizing plate of the invention.

The film of the invention can be preferably used by a configuration of protective film for polarizing plate/polarizer/protective film for polarizing plate/liquid crystal cell/film of the invention/polarizer/protective film for polarizing plate, or a configuration of protective film for polarizing plate/polarizer/film of the invention/liquid crystal cell/protective film for polarizing plate of the invention/polarizer/protective film for polarizing plate. In particular, by sticking the film of the invention to a liquid crystal cell of a TN type, a VA type, an OCB type, or the like and using the assembly, it is possible to provide a liquid crystal display device which is excellent in a viewing angle, small in coloration, excellent in visibility, and excellent in in-plane uniformity. Also, the polarizing plate using the film of the invention is small in deterioration under a high-temperature and high-humidity condition and is able to keep the stable performance over a long period of time. That is, the liquid crystal display device of the invention is also favorable in durability.

EXAMPLES

The invention is hereunder specifically described by reference to the following Examples. Materials, use amounts, proportions, treatment contents, treatment procedures, and so on shown in the following Examples can be properly changed so far as the gist of the invention is not deviated. In consequence, it should not be construed that the scope of the invention is limited to the following specific examples.

Example 1

Film Formation of Cellulose Acylate Film (1) Preparation of Dope:
<1-1> Cellulose Acylate Solution:

The following composition was thrown into a mixing tank, stirred to dissolve the respective components, further heated at 90° C. for about 10 minutes, and then filtered with a filter paper having an average pore size of 34 μm and a sintered metal filter having an average pore size of 10 μm.

| Cellulose acetate solution | |
|---|---|
| Cellulose acetate shown in Table 4: | 100 parts by mass |
| Dichloromethane: | 403.0 parts by mass |
| Methanol: | 60.2 parts by mass |

<1-2> Matting Agent Dispersion Liquid:

Subsequently, the following composition containing the cellulose acylate solution prepared in the foregoing method was thrown into a dispersion machine, thereby preparing a matting agent dispersion liquid.

| Matting agent dispersion liquid | |
|---|---|
| Silica particle having an average particle diameter of 16 nm (AEROSIL R972, manufactured by Nippon Aerosil Co., Ltd.): | 2.0 parts by mass |
| Dichloromethane: | 72.4 parts by mass |
| Methanol: | 10.8 parts by mass |
| Cellulose acylate solution: | 10.3 parts by mass |

<1-3> Additive Solution:

The cellulose acylate solution prepared in the foregoing method was thrown into a mixing tank and stirred for dissolution while heating, to which was then added each of additives shown in the following Table 4, thereby preparing an additive solution. Also, the respective additives are hereunder described.

Compound U expresses a retardation developing agent having the following structure.

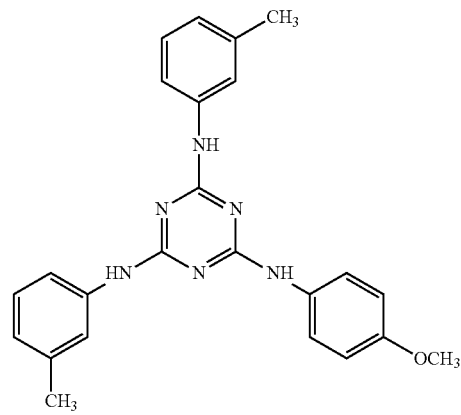

Compound U 100 parts by mass of the foregoing cellulose acylate solution, 1.35 parts by mass of the foregoing matting agent dispersion liquid, and the foregoing additive solution were mixed to prepare a dope for film formation.

The additive amount of each additive is independently adjusted so as to make each additive be an amount (parts by mass) described in Table 4 based on 100 parts by mass of cellulose acylate.

Incidentally, the cellulose acylate and various additives used as the raw materials of the dope were previously dried at 120° C. for 2 hours using a silo, manufactured by Nara Machinery Co., Ltd. and used.

(2) Casting Step:

Subsequently, the dope within a stock tank was subjected to feedback control by an inverter motor such that a primary-side pressure of a high-precision gear pump of a gear pump for primary pressure increase was 0.8 MPa and then subjected to solution sending. The high-precision gear pump had a performance of a volume efficiency of 99.3% and a fluctuation ratio of discharge amount of not more than 0.4%. Also, a discharge pressure was 1.4 MPa.

As a casting die, an apparatus equipped with a feed block having a width of 1.6 m and adjusted for co-casting, which is able to mold a film having a three-layered structure upon lamination on both surfaces in addition to a main stream, was used. In the following description, a layer formed from the main stream is called an interlayer; a layer on the support surface side is called a support surface; and a surface on the opposite side is called an air surface. Incidentally, as for a solution-sending flow path of the dope, three flow paths for interlayer, support surface and air surface, respectively were used. Incidentally, in manufacturing the present film, only the flow path for interlayer was utilized.

Then, casting was performed by adjusting a flow rate of the polymer dope at a die discharge port such that a film thickness of the accomplished polymer film was 80 µm. In order to adjust a temperature of the dope at 36° C., the casting die was provided with a jacket, thereby regulating an inlet temperature of a heat-conductive medium to be fed into the jacket at 36° C.

All of the die, the feed block and the pipe were kept at 36° C. during working steps. As for the die, a coat hunger type die, which is provided with thickness adjusting bolts at a pitch of mm and equipped with an automatic thickness adjusting mechanism by heat bolts, was used. The heat bolts can set a profile along a preset program in accordance with a liquid amount sent by the high-precision gear pump. Additionally, the adjustment amount of the heat bolts can be feedback controlled along an adjustment program on the basis of a profile of an infrared thickness gauge placed in the film formation step. A thickness difference between arbitrary two points of the film excluding a casting edge part of 20 mm, which were located far from each other by 50 mm, was adjusted within 1 µm, and the largest thickness difference in the width direction between the minimum values was also adjusted to not more than 2 µm/m. Also, a chamber for reducing the pressure was placed on the primary side of the die. A degree of pressure reduction of this pressure reducing chamber is set such that a pressure difference of from 1 Pa to 5,000 Pa can be applied before and after a casting bead and can be adjusted according to a casting speed. On that occasion, the pressure difference was set up such that a length of the bead was from 2 mm to 50 mm.

(Casting Die)

As for a material quality of the die, a material made of a two-phase based stainless steel having a mixed composition of an austenite phase and a ferrite phase and a thermal expansion coefficient of not more than $2\times10^{-5}$ (° C.$^{-1}$) and having corrosion resistance substantially equal to SUS316 in a forced corrosion test with an electrolyte aqueous solution was used. A finishing precision of the wetted surface between the casting die and the feed block was not more than 1 µm in terms of a surface roughness; a straightness was not more than 1 µm/m in any direction; and a clearance of the slit could be adjusted over the range of from 0.5 mm to 3.5 mm by means of automatic adjustment. In manufacturing the present film, casting was performed at a clearance of 1.5 mm. As for a corner portion of the wetted part of a die lip edge, processing was performed such that R was not more than 50 µm over the entire width of the slit. A shear rate in the inside of the die was in the range of from 1 (sec$^{-1}$) to 5,000 (sec$^{-1}$).

Also, for the lip edge of the casting die, one provided with a hardened film was used. Examples thereof include tungsten carbide (WC), $Al_2O_3$, TiN, and $Cr_2O_3$, with WC being especially preferable. In the invention, one having a WC coating formed thereon by a thermal spraying method was used. Also, a mixed solvent (dichloromethane/methanol/butanol (83/15/2 by mass)) that is a solvent for solubilizing the dope was fed into the bead edge and a gas-liquid interface of the slit at a rate of 0.5 mL/min per one side. Furthermore, in order to make the temperature of the pressure reducing chamber constant, a jacket was installed, and a heat-conductive medium adjusted at 35° C. was fed. For the heat-conductive medium, a medium capable of adjusting an edge suction wind amount within the range of from 1 L/min to 100 L/min was used, and in manufacturing the present film, the edge suction wind amount was properly adjusted within the range of 30 L/min to 40 L/min.

(Metal Support)

As the support, a stainless steel-made endless band having a length of 100 m was utilized. The band had a thickness of 1.5 mm and was polished so as to have a surface roughness of not more than 0.05 µm. Also, the band was made of SUS316 in terms of a material quality and had sufficient corrosion resistance and strength. A thickness unevenness of the whole of the band was not more than 0.5%. As the band, a band of a type to be driven by two drums was used, and on that occasion, a tension of the band was adjusted to $1.5\times10^4$ kg/m, and a difference in relative speed between the band and the drum was not more than 0.01 m/min. Also, a speed fluctuation of the band driving was not more than 0.5%. Also, in the band, the both edge positions were detected and controlled such that meandering in the width direction of one rotation was controlled to not more than 1.5 mm. Also, a position fluctuation in the vertical direction following the drum rotation on the support surface directly under the casting die was not more than 200 µm. The support is placed within a casing having wind pressure vibration controlling means. The dope was cast onto this support from the die. A surface temperature of the center of the support immediately before casting was 15° C. A temperature difference between the both edges was not higher than 6° C. The metal support must be free from a surface failure. A support which was utterly free from pinholes of 30 µm or more and in which a number of pinholes of from 10 µm to 30 µm was not more than one per m$^2$, and a number of pinholes of not larger than 10 µm was not more than two per m$^2$ was used.

(Casting Drying)

A temperature of a casting chamber provided with the foregoing casting die and support and the like was kept at 35° C. The dope cast on the band was first dried by blowing a dry wind in a parallel flow. On the occasion of drying, an overall heat transfer coefficient from the dry wind to the dope was 24 kcal/m$^2$·hr·° C. A temperature of the dry wind was set to 130° C. on the upstream side of an upper part of the band and 135° C. on the downstream side thereof, respectively. Also, a temperature of the dry wind was set to 6° C. in a lower part of the band. All of saturated temperatures of the respective gases were in the vicinity of −8° C. An oxygen concentration in a dry atmosphere on the support was kept at 5% by volume. Incidentally, in order to keep the oxygen concentration at 5% by volume, the wind was substituted with a nitrogen gas. Also, in order to condense and recover the solvent within the casting chamber, a condenser was provided, and its outlet temperature was set to −10° C.

A static pressure fluctuation in the immediate vicinity of the casting die was controlled to not more than ±1 Pa for 5 minutes after casting such that the dry wind was not exposed directly to the dope by a wind shielding apparatus. At a point of time when a ratio of the solvent in the dope reached 45% by mass on the basis of a dry amount, the film was released from the casting support. At that time, a release tension was 8 kgf/m, and a stripping rate (stripping roll draw) was appropriately set to enable stripping in the range of from 100.1% to 110% based on the rate of the support. Also, a surface temperature of the stripped film was 14° C. A drying rate on the support was 62% by mass (dry base solvent) per minute in average. A solvent gas generated upon drying was introduced into a condensing apparatus, liquefied at −10° C., recovered, and then reused as a solvent for charging. The dry wind from which the solvent had been removed was again heated and reused as a dry wind. On that occasion, the dry wind was adjusted such that the water content contained in the solvent was not more than 0.5%, and reused. The stripped film was conveyed in a latching part provided with a lot of rolls. The latching part was equipped with three rolls, and a temperature of the latching part was kept at 40° C. During conveying the film by the rolls of the latching part, a tension of from 16 N to 160 N was imparted to the film.

(Tenter Conveying/Drying Step Condition)

The stripped film was conveyed within a drying zone of a tenter having clips while fixing the both edges by the tenter and dried by a dry wind. The clips were cooled by feeding a heat-conductive medium at 20° C. thereinto. Driving of the tenter was performed by a chain, and a speed fluctuation of a sprocket thereof was not more than 0.5%. Also, the inside of the tenter was divided into 3 zones, and a dry wind temperature in each of the zones was set to 90° C., 100° C. and 110° C., respectively from the upstream side. A gas composition of the dry wind was one in a saturated gas concentration at −10° C. An average drying rate within the tenter was 120% by mass (dry based solvent) per minute. In an outlet of the tenter, an amount of the residual solvent in the film was adjusted to not more than 10% by mass, and in manufacturing the present film, a condition of the drying zone was adjusted such that the amount of the residual solvent in the film was 7% by mass. Stretching was also performed in a width direction while conveying the film within the tenter. Incidentally, when the width of the film on the occasion of conveyance into the temperature was defined as 100%, an amount of widening was set to 103% (draw ratio: 3%). A stretch ratio (tenter drive draw) from the stripping roll to the inlet of the tenter was 102%. A difference in a substantial stretch ratio between a tenter holding portion and a portion 10 mm away from the holding portion was not more than 10%, and a difference in a substantial stretch ratio between arbitrary two points 20 mm away from each other was not more than 5%.

A ratio of the length of the base edge fixed by the tenter was 90%. Also, the film was conveyed while cooling such that the temperature of the tenter clips did not exceed 50° C. The solvent evaporated in the tenter portion was condensed and liquefied at a temperature of −10° C. and recovered. A condenser for condensing and recovering was provided, and its outlet temperature was set at −8° C. The recovered solvent was reused after adjusting the water content to not more than 0.5% by mass.

Then, the both edges of the film were cut from the tenter outlet within 30 seconds. Both edges of the film were cut using an NT type cutter at 50 mm from each side end. An oxygen concentration in the dry atmosphere of the tenter part was kept at 5% by volume. Incidentally, in order to keep the oxygen concentration at 5% by volume, the air was substituted with a nitrogen gas. Before performing high-temperature drying in a roll conveying zone as described later, the film was preliminarily heated in a preliminary drying zone into which a dry wind at 100° C. was fed.

(Post-Drying Step Condition)

The polymer film whose both edges had been cut as obtained in the foregoing method was subjected to high-temperature drying in a roll conveying zone. The roll conveying zone was partitioned into four sections, into which was then fed a dry wind at 120° C., 130° C., 130° C. and 130° C., respectively from the upstream side. At that time, a roll conveying tension of the film was 100 N/width, and drying was performed for about 10 minutes until the residual solvent amount finally reached 0.3% by mass. Wrap angles of the roll were 90 degrees and 180 degrees. The material of the roll was made of aluminum or carbon steel, and a surface thereof was subjected to hard chrome plating. Two types of rolls were used, in which in the first type, the surface of the roll was flat, and in the second type, the surface of roll was subjected to matting processing by means of blasting. All of positional fluctuations by rotation of the roll were not more than 50 μm. Also, a roll bending at a tension of 100 N/width was chosen so as to fall within 0.5 mm.

A compulsory neutralizing apparatus (neutralizing bar) was installed such that a charged voltage of the film was constantly kept so as to fall within the range of from −3 kV to +3 kV during conveyance. Also, in the winding part, not only the neutralizing bar but an ionic-wind neutralizing apparatus was installed such that the charged voltage fell within the range of from −1.5 kV to 1.5 kV.

The dried film was conveyed into a first humidity control chamber. In a latching part between the roll conveying zone and the first humidity control chamber, a dry wind at 110° C. was fed. Air at a temperature of 50° C. and a dew point of 20° C. was fed into the first humidity control chamber. Furthermore, the film was conveyed into a second humidity control chamber for suppressing the generation of curling of the film. In the second humidity control chamber, air at a temperature of 90° C. and a humidity of 70% was exposed directly to the film.

(Post-Treatment and Winding Conditions)

The polymer film after drying was cooled to not higher than 30° C., and both edges thereof were cut. Edge cutting was performed in such a manner that every two apparatuses for slitting the film edge were installed in both of left and right edges of the film (the number of slitting apparatuses was two per one side), and each film edge was slit. Here, the slitting apparatus was constituted of a disc-shaped rotating upper blade and a roll-shaped rotating lower blade; a material of the rotating upper blade was made of an ultra-hard steel material; a diameter of the rotating upper blade was 200 mm; and a thickness of the blade in a cutting portion was 0.5 mm. A material of the roll-shaped rotating lower blade was made of an ultra-hard steel material, and a roll diameter of the rotating lower blade was 100 mm.

Then, a surface roughness (arithmetical average roughness: Ra) of the slit film section was measured and found to be 0.2 μm. Also, the slit film section was relatively smooth, and no chip was observed. Also, in the film formation of the cellulose ester film, breakage of the film was not observed at all during conveyance.

Here, the surface roughness of the film section was measured using a surface roughness analyzer (NewView 5010, manufactured by ZYGO Corporation) under an apparatus condition at an object lens by a factor of 50 and an image zoom by a factor of 1.3. Also, in that case, the measurement condition was properly set employing a Mesure Cntrl Key, and the measured data were subjected to data processing by appropriately setting an Analyze Cntrl Key.

A cellulose ester film having a width of 1,500 mm and a film thickness of 80 μm was thus obtained and wound by a winder. Also, a dimensional change ratio of a place in a width of mm from the film edge of the slit cellulose ester film was measured. As for evaluation of the dimensional change ratio, a percentage of a size (length in the width direction) of the cellulose ester film changed after keeping for 120 hours in an environment at a temperature of 90° C. and a relative humidity of 5% relative to a size (length in the width direction) immediately after manufacturing the cellulose ester film was taken and evaluated. As a result, the dimensional change ratio of the place in a width of 20 mm from the cellulose ester film edge was −0.13%, and there was no problem.

Furthermore, the both edges of the film were subjected to knurling. The knurling was imparted by performing embossing processing from one side, a width of knurling was 10 mm, and a pressure was set such that a maximum height was higher by 12 μm in average than an average thickness.

Then, the film was conveyed into a winding chamber. The inside of the winding chamber was kept at a temperature of 25° C. and a humidity of 60%. A product width of the thus obtained polymer film was 1,500 mm. A diameter of a winding core was 169 mm, and a tension pattern was adopted such that the tension was 390 N/width in the beginning of winding and 250 N/width in the end of winding, respectively. A total length of winding was 3,250 m. In winding, an oscillation period was 400 m, and an oscillation width was ±5 mm. Also, a press roll was pressed to the winding roll at 50 N/width. At the time of winding, a temperature of the film was 25° C., a water content was 0.8% by mass, and a residual solvent amount was 0.2% by mass. An average drying speed throughout the whole of the steps was 20 mass % (dry base solvent) per minute. Also, no winding looseness and wrinkles were found. Unevenness in winding did not occur in an impact test at 10 G. Also, an appearance of the roll was favorable. A polymer film sample was film-formed through the foregoing steps. The roll of the film sample was stored in a storing rack at a temperature of 25° C. and a relative humidity of 55% for a month. A similar test as the above was applied. As a result, no significant difference was found in the both cases. Furthermore, there was no adhesion within the roll. Also, after film formation of the film sample, any release residue of the cast film formed from the dope was not found on an endless belt as the metal support.

Regarding other film samples, they were prepared in a same manner as in Example 1 by using the materials shown in Table 4 and adjusting a film thickness so as to become Re and Rth described in Table 4. That is, an amount of widening in stretching of a film in a width direction was set to 103%.

<Measuring Method>
(Film Optical Characteristics)

An in-plane retardation Re was determined by performing three-dimensional birefringence measurement at a wavelength of 590 nm using an automatic birefringence meter KOBRA 21ADH (manufactured by Oji Scientific Instruments) according to the foregoing method, and a retardation Rth in a film thickness direction was determined by measuring Re while changing a tilt angle.

Furthermore, the obtained Rth (unit: nm) value was divided by a film thickness d (unit: μm) of each film, thereby determining Rth and Rth/d per film thickness.

(Film Elastic Modulus)

A sample of 150 mm×10 mm (TD×MD) was subjected to humidity control at a temperature of 25° C. and a relative humidity of 65% for 2 hours. By using a universal tension tester, STM T50BP (manufactured by Toyo Baldwin Co., Ltd.), a stress-strain curve was measured by a stretching treatment in the TD direction at an initial sample length of 50 mm and 10%/min in an atmosphere at a temperature of 23° C. and a relative humidity of 60%, thereby determining a film elastic modulus E' (TD) (unit: MPa) in the MD direction.

Furthermore, in 19 samples, E' (TD) was measured in every width of 100 mm. An average value thereof was determined, and a standard deviation σ (unit: GPa) of the elastic modulus E' (TD) in the film width direction was determined by the following method.

With respect to the obtained 19 data, the following calculation was made.

$$\bar{x} = \frac{1}{n}\sum_{i=1}^{n} x_i$$

Here, $x_i$ represents scattering of each E' (TD), and n is 19.

A dispersion σ was calculated according to the following expression.

$$\sigma^2 = \frac{1}{n}\sum_{i=1}^{n}(x_i - \bar{x})^2$$

The measurement results are shown in the following Table 4.

TABLE 4

| | Cellulose acylate resin | | | | | | Evaluation of film physical properties | | | | |
| | Acyl substitution degree | Acetyl substitution degree | Additive 1 | | Additive 2 | | | | | | Elastic |
| | | | Kind | Addition amount | Kind | Addition amount | d (μm) | Re (nm) | Rth (nm) | Rth/d (×10⁻³) | modulus (GPa) |
| --- | --- | --- | --- | --- | --- | --- | --- | --- | --- | --- | --- |
| Example 1 | 2.81 | 2.81 | PB-33 | 9 | U | 4 | 30 | 0.2 | 74 | 2.5 | 4.5 |
| Example 2 | 2.81 | 2.81 | PB-33 | 9 | U | 8 | 30 | 0.4 | 105 | 3.5 | 4.4 |
| Example 3 | 2.81 | 2.81 | PB-33 | 9 | | | 40 | 0.2 | 52 | 1.3 | 4.5 |
| Example 4 | 2.81 | 2.81 | PB-33 | 9 | U | 2 | 40 | 0.4 | 80 | 2.0 | 4.4 |
| Example 5 | 2.81 | 2.81 | PB-33 | 9 | U | 4 | 40 | 0.3 | 100 | 2.5 | 4.4 |
| Example 6 | 2.81 | 2.81 | PB-33 | 9 | U | 6 | 40 | 0.4 | 118 | 2.9 | 4.3 |
| Example 7 | 2.81 | 2.81 | PB-33 | 9 | | | 60 | 0.5 | 75 | 1.2 | 4.1 |
| Example 8 | 2.81 | 2.81 | PB-33 | 9 | U | 2 | 60 | 0.6 | 114 | 1.9 | 4.1 |
| Example 9 | 2.81 | 2.81 | PB-33 | 9 | U | 4 | 60 | 0.5 | 148 | 2.5 | 4.0 |
| Example 10 | 2.81 | 2.81 | PB-33 | 9 | U | 6 | 60 | 0.3 | 173 | 2.9 | 4.0 |
| Example 11 | 2.81 | 2.81 | PB-33 | 9 | U | 8 | 60 | 0.3 | 200 | 3.3 | 4.0 |
| Example 12 | 2.81 | 2.81 | PB-33 | 9 | U | 8 | 64 | 0.3 | 220 | 3.4 | 4.0 |
| Comparative Example 1 | 2.81 | 2.81 | PB-33 | 9 | | | 30 | 0.2 | 44 | 1.5 | 4.5 |
| Comparative Example 2 | 2.81 | 2.81 | PB-1 | 9 | | | 80 | 0.6 | 55 | 0.7 | 4.7 |
| Comparative Example 3 | 2.81 | 2.81 | PA-1 | 9 | | | 80 | 0.3 | 0.1 | 0.0 | 4.1 |
| Comparative Example 4 | 2.42 | 2.42 | PB-10 | 15 | | | 60 | 1.1 | 104 | 1.7 | 3.5 |

[Manufacture of Polarizing Plate]

Iodine was adsorbed in a stretched polyvinyl alcohol film, thereby fabricating a polarizer.

The saponified cellulose acylate film of Example 1 was stuck onto one side of the polarizer with a polyvinyl alcohol based adhesive. A commercially available cellulose triacetate film (FUJI TAC TD80UF, manufactured by Fujifilm Corporation) was similarly subjected to a saponification treatment, and the thus saponified cellulose triacetate film was stuck onto the opposite side of the polarizer to the side on which the film of Example 1 was stuck, with a polyvinyl alcohol based adhesive.

On that occasion, the fabricated film of Example 1 was disposed in such a manner that its slow axis was parallel to a transmission axis of the polarizer. Also, the commercially available cellulose triacetate film was disposed in such a manner that its slow axis was orthogonal to a transmission axis of the polarizer.

In this way, a polarizing plate having the film of Example 1 as a protective film was fabricated. Though the film of Example 1 had a thickness of 30 μm, it did not involve problems in handling properties and processability, so that a favorable polarizing plate could be obtained.

What is claimed is:

1. A cellulose ester film comprising at least one plasticizer and satisfying the following expressions (1) to (5):

$$|Re| \leq 5 \text{ nm} \quad (1)$$

$$50 \text{ nm} < Rth < 300 \text{ nm} \quad (2)$$

$$25 \text{ μm} \leq d \leq 65 \text{ μm} \quad (3)$$

$$1 \times 10^{-3} \leq Rth/d \leq 4 \times 10^{-3} \quad (4)$$

$$3.8 \text{ GPa} < E' < 5.0 \text{ GPa} \quad (5)$$

wherein Re represents a retardation value in an in-plane direction; Rth represents a retardation value in a thickness direction; d represents a film thickness; and E' represents an elastic modulus of the film, wherein the plasticizer is a polycondensed polyester containing an aromatic ring, and wherein the polycondensed polyester satisfies the following (I) and (II):

(I) it contains a dicarboxylic acid residue containing an aromatic dicarboxylic acid residue and an aliphatic dicarboxylic acid residue having an average carbon number of from 4.0 to 6.0 and having an aromatic dicarboxylic acid residue ratio as expressed by the following expression of from 40 mol % to 95 mol %:

Aromatic dicarboxylic acid residue ratio (mol %)=
[(Aromatic dicarboxylic acid residue (mol))/{
(Aromatic dicarboxylic acid residue (mol))+(Aliphatic dicarboxylic acid residue (mol))}]×100 and (II) it contains an aliphatic diol residue having an average carbon number of from 2.0 to 3.0.

2. The cellulose ester film according to claim 1, wherein the polycondensed polyester has a number average molecular weight of 700 or more and not more than 2,500.

3. The cellulose ester film according to claim 1, wherein the cellulose ester film is a film stretched 3% or more in a TD direction.

4. The cellulose ester film according to claim 1, wherein the cellulose ester film is constituted of a cellulose acylate, and the cellulose acylate film has an acyl group substitution degree of from 2.10 to 2.95.

5. A polarizing plate utilizing the cellulose ester film according to claim 1.

6. A liquid crystal device utilizing the cellulose ester film according to claim 1.

7. A method for producing the cellulose ester film according to claim 1, wherein the cellulose ester film is stretched 3% or more in a TD direction.

* * * * *